United States Patent
Ebina et al.

[11] Patent Number: 6,089,117
[45] Date of Patent: Jul. 18, 2000

[54] BALL SCREW DEVICE

[75] Inventors: Shigeru Ebina; Ryuji Takeda, both of Tokyo, Japan

[73] Assignee: THK Co., Ltd., Tokyo, Japan

[21] Appl. No.: 09/269,167

[22] PCT Filed: Jul. 30, 1998

[86] PCT No.: PCT/JP98/03390

§ 371 Date: Mar. 23, 1999

§ 102(e) Date: Mar. 23, 1999

[87] PCT Pub. No.: WO99/06740

PCT Pub. Date: Feb. 11, 1999

[30] Foreign Application Priority Data

Jul. 31, 1997 [JP] Japan .................................. 9/206600
Jul. 31, 1997 [JP] Japan .................................. 9/206601

[51] Int. Cl.[7] .................................................. F16H 25/22
[52] U.S. Cl. ............................................................ 74/459
[58] Field of Search .................................................. 74/459

[56] References Cited

U.S. PATENT DOCUMENTS 4,148,226  4/1979  Benton .

FOREIGN PATENT DOCUMENTS

| 49-64672 | 9/1972 | Japan . |
| 61-41924 | 3/1986 | Japan . |
| 3-121341 | 5/1991 | Japan . |
| 5-3715 | 1/1993 | Japan . |
| 5-27408 | 4/1993 | Japan . |
| 7-167243 | 7/1995 | Japan . |

*Primary Examiner*—Dirk Wright
*Attorney, Agent, or Firm*—Arent Fox Kintner Plotkin & Kahn, PLLC

[57] ABSTRACT

A ball screw unit comprising a screw having a helical ball rolling groove on the outer peripheral surface thereof, a nut assembly having a load zone formed of a helical load rolling groove opposing to the ball rolling groove of the screw and a no-load zone forming a ball endless track by establishing communication between the starting end and the terminating end of the load zone, a number of balls rolling within the endless track of the nut assembly and a ball coupler comprised of coupling members for retaining the balls to rotate in their aligned state, wherein guide grooves for guiding the coupling members of the ball coupler are formed in the load zone of the ball endless track such that the coupling members of the ball coupler are moved by each of the balls in the no-load zone of the endless track while each of the balls is guided to move by the coupling members of the ball coupler in the no-load zone of the endless track, and guide sections for guiding the ball coupling members of the ball coupler along the progressing direction of the balls moving in the load zone are provided at least at both ends of the no-load zone near the load zone, respectively. Thus, according to the present invention, the delivery and reception of the balls are performed smoothly between the load zone and the no-load zone of the ball endless track to thereby achieve the smooth circulation of the balls.

15 Claims, 25 Drawing Sheets

Fig. 6
Fig. 7
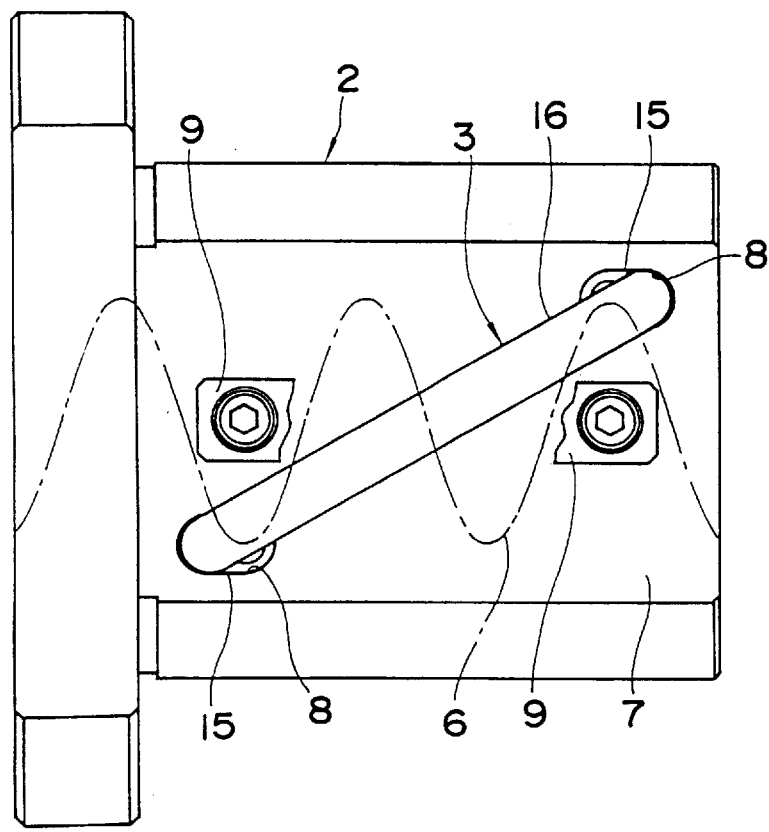
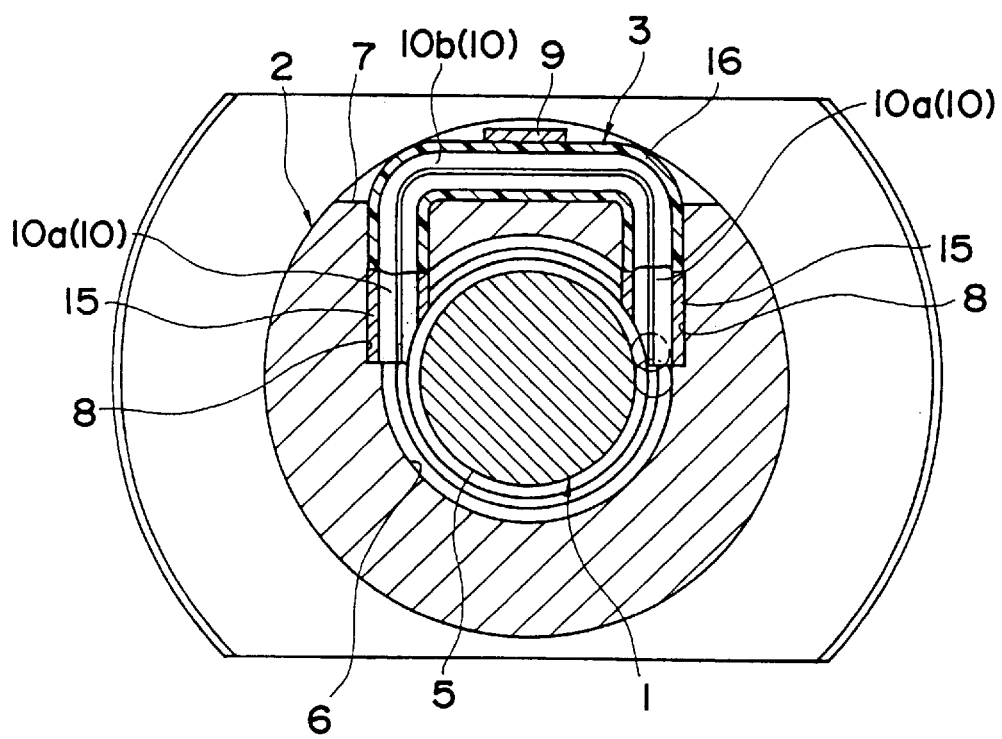

BALL SCREW DEVICE

TECHNICAL FIELD

The present invention relates to a ball screw unit comprising a screw and a nut assembly which are screw-fitted with each other through a number of balls and adapted to covert the rotary motion of a motor or the like to a linear motion at the slide portion of a machine tool or an industrial robot, and more particularly, to a tube type ball screw unit using a nut and a ball circulating cylindrical body or a side cover type ball screw unit using a nut and a pair of covers respectively fixed to both ends of the nut for the purpose of forming an endless track for the balls.

BACKGROUND TECHNOLOGY

Generally, the ball screw unit basically comprises a screw provided with a helical ball rolling groove on the outer peripheral surface thereof, a nut provided on the inner peripheral surface thereof with a helical load rolling groove held opposite to the ball rolling groove of the screw and having the same lead angle as the latter and a number of balls interposed between the load rolling groove and the ball rolling groove so as to roll while bearing a load and wherein an endless track for causing the balls to circulate therethrough is formed by constructing a nut assembly by fixing a ball circulating tubular body or a pair of covers to the nut.

Conventionally, there have been known several methods for forming the above-described ball endless track.

For example, regarding the tube type ball screw unit, there is known a tube system (Japanese Unexamined Utility Model Publication No. S49-64,672) in which as shown in FIGS. 40 and 41, ball tubes(f)(ball circulating tubular bodies) each provided on both ends thereof with tongues (g) are passed between the starting end and the terminating end of a load zone formed by a ball rolling groove(b) of a screw(a) and a load rolling groove(d) of a nut(c) such that each of balls(e) rolling within the ball rolling groove(b) of the load zone is picked up or fed into the groove (b) by the tongues (g) projecting into the groove (b) so that each of the balls(e) coming out from the terminating end of the load zone is circulated again into the starting end of the load zone through the ball tubes (f).

According to this tube system, however, when each of the balls(e) moves from the terminating end of the load zone of the endless track to the no-loaded zone thereof, the ball(e) runs against the tongue(g) of each of the tubes (f) so that the rolling ball(e) is picked up into the ball tube(f) forming the no-load zone and is then circulated again into the starting end of the load zone.

Further, as regards the side cover type ball nut and screw unit, there is known a side cover system disclosed in the U.S. Pat. No. 4,148,226 (entitled "Ball nut and screw assembly") in which as shown in FIGS. 42 through 44, a ball return hole(h) is drilled in a nut(c) along an axial direction of the outer peripheral solid portion thereof and a pair of side covers (k) are respectively fixed to both ends of the nut(c) through spacers(i) so that the progressing direction of each of balls(e) coming out of the terminating end of a load zone formed by a ball rolling groove (b) of a screw(a) and a load rolling groove(d) of the nut(c) is inclined by each of the side covers (k) and each of the spacers(i) thereby guiding the ball(e) from the terminating end of the load zone up to the outer cylindrical surface of a screw (a). Further, a change direction path(j) for guiding the ball(e) up to the ball return hole(h) of the nut(c) is formed in each of the side covers thereby forming a ball endless track.

However, this system is also constructed such that when the ball(e) moves from the terminating end of the load zone of the ball endless track to the no-load zone, the ball (e) runs against the side wall of the change direction path (j) inclined with respect to the ball progressing direction at the terminating end of the load zone, that is, from the tangential direction along the lead angle of the load rolling groove(d), so that the rolling ball(e) is picked up into the change direction path(j) forming the no-load zone and is circulated again to the starting end of the load zone.

Therefore, in the cases of the above-described conventional ball screw units, when each of the balls rolling in the load zone is picked up into the no-load zone or the balls in the no-load zone are fed to the load zone, the presence of the tongue (g) for changing the progressing direction of the rolling balls is indispensable so that the smooth circulation of the balls is impaired and as a result, the uniform and stabilized rotation of the ball screw unit is impaired, the working life of the unit is shortened or noises generate.

Further, in Unexamined Published Japanese Utility Model Application No.H5-27,408, there is disclosed a ball screw unit wherein as shown in FIG. 45 thereof, a flexible belt-like retainer (i) is slidably inserted into a ball circulation path (h) provided with a ball circulating pipe (a ball tube (f)) so as to extend over the entire length of the path (h) and a number of ball pockets (not shown) are mounted on the retainer (i) at predetermined intervals over the entire length thereof so that balls(e) are rotatably retained within the pockets, respectively, whereby the adjoining balls do not come into contact with each other, the ball screw unit can have an excellent operation characteristic free of torque dispersion and can allow the balls to smoothly circulate through the ball circulation path(h).

However, in the case of such ball screw unit, the belt-like retainer(i) assembled into the ball circulation path(h) is inevitably twisted and bent and it is necessary to absorb such twisting and bending of the retainer (i) within the ball circulation path(h) so that although the idea of "providing a ball screw unit having an excellent operation characteristic by preventing the adjoining balls from coming into contact with each other by the belt-like retainer assembled into the ball circulating path" may be accepted as reasonable, there is actually no suitable means as to how to absorb the twisting and bending of the belt-like retainer (i) within the ball circulating path (h) and it is the actual situation that such idea has not been materialized as a complete product.

Thus, in the cases of the conventional ball screw units, irrespective of whether or not they employ the system for forming a ball endless track, when each of the balls rolling in the load zone is picked up into the no-load zone or each of the balls in the no-load zone is fed into the load zone, it becomes necessary to provide a means for changing the progressing direction of the balls so that the smooth circulation of the balls is inevitably impaired which results in that the uniform and stabilized rotation of the ball screw unit is impaired, the working life of the unit is shortened or noises generate.

Therefore, as a result of their intuitive investigation of means for fundamentally solving the above-described problems, the present inventors have completed the present invention by finding out the following fact. That is, when a ball coupler is formed by making use of a plurality of flexible coupling members having the function of rotatably retaining a number of balls in their aligned state, a guide groove for guiding the coupling members of the ball coupler is formed in a no-load zone of a ball endless track, the ball coupler is moved by each of the balls in a load zone of the endless track while the balls are guided to move in the no-load zone of the endless track by the coupler and guide sections for guiding the coupling members of the ball coupler along the progressing direction of the balls moving in the load zone are respectively provided at both ends of the no-load zone at least near the load zone, the delivery and reception of the balls between the load zone and the no-load zone of the endless track are performed smoothly to thereby achieve the smooth circulation of the balls within the endless track.

Accordingly, an object of the present invention is to provide a ball screw unit which comprises a screw, a nut assembly screw-fitted with the screw through a ball and having a ball endless track and a ball coupler assembled into the endless track of the nut assembly and which makes smooth the delivery and reception of the balls to be performed between a load zone and a no-load zone of the endless track thereby achieving the smooth circulation of the balls.

Another object of the present invention is to provide a tube type ball screw unit including a nut assembly comprising a nut having a load rolling groove forming a load zone of a ball endless track and a ball circulating tubular body having a no-load ball path forming a no-load zone of the ball endless track whereby the delivery and reception of the balls to be performed between the load zone and the no-load zone of the ball endless track can be performed smoothly thereby achieving the smooth circulation of the balls.

Still another object of the present invention is to provide a side cover type ball screw unit which includes a nut assembly comprising a nut having a load rolling groove forming a load zone of a ball endless track and a no-load ball path forming a no-load zone of the ball endless track and a pair of side covers respectively attached to both ends of the nut and having change direction paths forming the no-load zone of the ball endless track, and which makes smooth the delivery and reception of the balls between the load zone and the no-load zone of the endless track to thereby achieve the smooth circulation of the balls.

DISCLOSURE OF THE INVENTION

That is, the present invention relates to a ball screw unit comprising a screw having a helical ball rolling groove on the outer peripheral surface thereof, a nut assembly having a load zone formed by a helical load rolling groove opposing to the ball rolling groove of the screw and a no-load zone forming a ball endless track by establishing communication between the starting end and the terminating end of the load zone, a number of balls rolling within the endless track of the nut assembly and a ball coupler formed of coupling members for retaining the balls to rotate in their aligned state, wherein the no-load zone of the ball endless track is provided with a guide groove for guiding the coupling members of the ball coupler, the coupling members are moved by the balls in the load zone while they guide and move the balls in the no-load zone of the endless track and further, guide sections for guiding the coupling members along the progressing direction of the balls moving in the load zone are respectively provided at least at both ends of the no-load zone near the load zone.

The ball screw unit of the present invention described above is of a tube type wherein the nut assembly comprises a nut having on the inner peripheral surface thereof a helical load rolling groove opposing to the above-described ball rolling groove of the screw and a ball circulating tubular body fixed to the nut and having a no-load ball path forming a ball endless track by establishing communication between the starting end and the terminating end of the load rolling groove and wherein a guide groove for guiding the coupling members of the ball coupler is formed in the no-load zone of the endless track that is formed by the no-load ball path such that the coupling members are moved by the balls in the load zone of the endless track that is formed by the load rolling groove while the balls are guided to move by the coupling members in the no-load zone of the endless track, and guide sections for guiding the coupling members along the progressing direction of the balls moving along the load rolling groove are formed in the no-load ball path at least on the side of the load rolling groove.

Further, the ball screw unit of the present invention described above is of a side cover type wherein the nut assembly comprises a nut having on the inner peripheral surface thereof a helical load rolling groove opposing to the ball rolling groove of the screw and a no-load ball path, and a pair of side covers respectively fixed to both ends of the nut with each of the pair having a change direction path forming part of the ball endless track by establishing communication between the load rolling groove and the no-load ball path and guide grooves for guiding the coupling members are formed in the no-load zone of the endless track formed by the change direction paths and the no-load ball path such that the coupling members of the ball coupler are moved by the balls in the load zone of the endless track formed by the load rolling groove while the balls are guided to move by the coupling members in the no-load zone, and guide sections for guiding the coupling members along the progressing direction of the balls moving along the load rolling groove are provided in the change direction paths at least on the side of the load rolling groove.

First, the tube type ball screw unit of the present invention will be described in detail.

The first structure of the tube type ball screw unit of the present invention is such that the unit comprises a screw having a helical load rolling groove on the outer peripheral surface thereof, a nut having on the inner peripheral surface thereof a helical-load rolling groove opposing to the ball rolling groove of the screw, a ball circulating tubular body mounted on the nut and having a no-load ball path forming a ball endless track by establishing communication between the starting end and the terminating end of the load rolling groove, a number of balls rolling through the endless track and a ball coupler comprised of a plurality of coupling members capable of retaining the balls in their rotatable and aligned state wherein a guide groove for guiding the coupling members of the ball coupler is formed in a no-load zone of the ball endless track formed of the no-load ball path such that the coupling members are moved by each of the balls in the load zone of the endless track formed by the load rolling groove while the balls are guided to move by the coupling members in the no-load zone of the endless track, and guide sections for guiding the coupling members along the progressing direction of the balls rolling along the load rolling groove are formed in the no-load ball path at least on the side of the load rolling groove.

Further, the second structure of the tube type ball screw unit of the present invention is such that the unit comprises a screw having a helical ball rolling groove on the outer peripheral surface thereof, a nut having on the inner peripheral surface thereof a helical load rolling groove opposing to the ball rolling groove of the screw and a no-load ball path for circulating each of balls from one end to the other end of the load rolling groove and screw-fitted with the screw through the balls, a ball circulating tubular body mounted in the nut with its one end opening at the terminating end of the load rolling groove while the other end opens at the starting end thereof and forms a no-load ball path such that each of the balls coming out of the terminating end of the load rolling groove is fed to the starting end of the load rolling groove through the no-load path to thereby circulate the balls, a number of balls rolling through an endless track formed by the load rolling groove of the nut and the no-load ball path of the ball circulating tubular body and a ball coupler comprised of a plurality of flexible coupling members capable of coupling the balls in a chain-like fashion. The coupling members of the ball coupler comprise a plurality of interposers put among the balls and a plurality of coupling sections for establishing communication between the interposers so that the balls are respectively retained by the coupling members in their rotatable and aligned state. Further, the ball circulating tubular body is formed by a pair of tubular pieces and a tubular body connecting these tubular pieces. Each of the tubular pieces is provided at least on the side of its load rolling groove with a guide hole having a guide zone for guiding each of the balls in the tangential direction along the lead angle of the load rolling groove. Further, into the guide holes of the pair of tubular pieces and the communication hole of the tubular body forming a no-load ball path by establishing communication between the guide holes there are formed guide grooves with which the coupling members of the ball coupler slidably fit so as to be guided thereby so that in the load rolling groove forming the load zone of the endless track, the coupling members are moved by the balls rolling along the load rolling groove and in the no-load ball path forming the no-load zone of the endless track, the balls are guided to move by the coupling members moving through the path.

In the case of this tube type ball screw unit, the ball rolling groove to be formed on the outer peripheral surface of the screw may be circular in shape having substantially a semi-circular ball rolling surface in section or in the shape of a gothic arch having two substantially quadrant-like ball rolling surfaces intersecting each other and one or two or more such ball rolling grooves may be formed.

Further, as regards the nut to be screw-fitted with the screw through a number of balls, it has on the inner peripheral surface thereof a helical load rolling groove opposing to the ball rolling groove of the screw, and as regards this helical load rolling groove, like the ball rolling groove of the screw, it may be circular in shape having substantially a semicircular ball rolling surface in section or in the shape of a gothic arch having two substantially quadrant-like ball rolling surfaces intersecting each other and further, one or two or more such ball rolling grooves may be formed in correspondence to the number of the ball rolling grooves.

In the present invention, the ball circulating tubular body forming the no-load ball path of the endless track is formed of a pair of tubular pieces and a tubular body establishing communication between the tubular pieces and each of these pieces is provided at least on the side of its load rolling groove with a guide hole having a guide zone for guiding each of the balls tangentially along the lead angle of the load rolling groove and further, the guide hole of each of the pair of tubular pieces and the communication hole of the tubular body forming the no-load ball path by establishing communication between the guide holes of the tubular pieces are respectively provided with guide grooves with which the coupling sections of the ball coupler slidably fit so as to be guided thereby.

As regards the guide holes of the pair of tubular pieces, it is preferable that the guide holes be twisted and/or bent over the range from their starting ends on the side of the load rolling groove of the nut to their terminating ends on the side of the communication hole of the tubular body in such a manner that the guide grooves are held in a symmetrical positional relationship with each other at their starting ends on the side of the load rolling groove while they are held in the same positional relationship with each other at their terminating ends on the side of the communication hole, whereby the tubular body which establishes communication between the pair of tubular pieces can be formed with ease.

It is particularly preferable that the guide hole of each of the pair of tubular pieces be formed to be a guide zone over the entire length thereof and a part or the whole of the guide grooves of the guide hole be twisted, that the guide grooves of the tubular body for establishing communication between the pair of tubular pieces be so formed as to be held in the same positional relationship with each other over the range from the starting end to the terminating end of the tubular body and the tubular body be formed to have bent portions at the starting end and the terminating end thereof, respectively, that the pair of tubular pieces be made to have quite the same shape by using a material obtained by sintering a powdered metal and that the tubular body for establishing communication between the pair of tubular pieces be formed by a pair of tube strips of quite the same shape. Thus, by forming the ball circulating tubular body with a pair of tubular pieces of the same shape and a pair of tube strips of the same shape, the number of molded parts can be minimized.

As regards the shape of each of the tubular pieces, it is preferable that the outer configuration thereof be formed non-circular such as elliptical, square, pentagonal or the like and that non-circular fitting holes each corresponding to the outer configuration of each of the tubular pieces are drilled in the nut so that the tubular pieces to be mounted in the nut are correctly positioned by fitting the tubular pieces into these fitting holes, respectively.

Further, each of the tubular pieces may be formed as a single part in its entireties or as a plurality of divided parts such that when the divided parts are fitted into a fitting hole drilled in the nut, the divided parts are combined to become a complete tubular piece.

As regards the method of connecting the pair of tubular pieces and the tubular body, there is no particular limitation thereto only if the no-load ball path formed by the tubular pieces and the tubular body and the guide groove formed along the no-load ball path are formed smoothly and continuously without any level difference or step. However, it is preferable that the nut be provided on the outer peripheral surface thereof with a mounting surface to which the tubular body is fixed and that the depth of each of the fitting holes drilled in the nut is made larger than the length of each of the tubular pieces. Further, it is preferable that on the upper surface of each of the tubular pieces there be formed a stepped portion for positioning each end of the tubular body so that the tubular body may be fixed to the mounting surface of the nut by means of solid metal fixtures after positioning both ends of the tubular body at the stepped portions, respectively.

The twisting and/or bending to be applied on the no-load ball path of the ball circulating tubular body comprising the pair of tubular pieces and the tubular body may be performed wholly on the sides of the tubular pieces but in that case, the twisting may well be applied only on the tubular pieces while the bending is applied on the tubular body. Thus, it is recommended that the twisting and/or bending processes be performed separately one for the tubular pieces and the other for the tubular body whereby the improvement of workability of the unit and the universalization of the molded parts are contrived and the manufacturing cost is reduced through the reduction of the number of parts used.

The ball coupler to be assembled into the ball endless track is required to be formed such that the balls are coupled to one another by coupling members in a chain-like fashion lest the balls run against one another and that it is necessary for the ball coupler to retain the balls in their rotatable state without falling off in such a manner that the coupling members are moved by the balls rolling along the load zone in the load zone of the ball endless track while the balls are guided to move by the coupling members moving along the no-load zone in the no-load zone. Therefore, the ball coupler is constructed by a plurality of interposers put among the balls and a plurality of coupling members connecting the interposers.

This ball coupler to be assembled into the ball endless track may be in the form of a single non-endless ball coupler of the above-described structure or a plurality of such ball couplers may be assembled into the ball endless track, or it may be in the form of a single endless ball coupler of the above-described structure.

According to the tube type ball screw unit of the present invention, especially due to the structure that the unit is provided with a ball circulating tubular body, a ball coupler retaining a number of balls through coupling members in their rotatable and aligned state is assembled into the ball endless track, guide grooves for guiding the ball coupler are formed in the no-load ball path forming the no-load zone of the ball endless track such that the ball coupler is moved by the balls in the load rolling groove forming the load zone of the endless track while the balls are guided to move by the ball coupler in the no-load zone and further, guide sections for guiding the ball coupler in the progressing direction of the balls moving along the load rolling groove are provided in the no-load ball path at least on the sides of the load rolling groove, the delivery and reception of the balls between the load zone and the no-load zone of the endless track becomes quite smooth thereby achieving the smooth circulation of the balls.

Further, in the tube type ball screw unit having such ball circulating tubular body, due to the structure that the ball coupler retaining a number of balls in their rotatable and aligned state is assembled into the ball endless track of the unit, the ball circulating tubular body forming the no-load zone is formed by the pair of tubular pieces and the tubular body establishing communication between the pair of tubular pieces, guide holes each having a guide zone for guiding each of the balls tangentially along the lead angle of the load rolling groove (or the lead angle of the ball rolling groove) is formed at least on the side of the load rolling groove, the guide holes of the pair of tubular pieces and the communication hole of the tubular body forming the no-load ball path by connecting the guide holes are provided with guide grooves for guiding the coupling members of the ball coupler slidably coming into engagement therewith so that the coupling members of the ball coupler are guided to move by the balls in the load zone of the ball endless track while the balls are guided to move by the coupling members in the no-load zone of the ball endless track, the delivery and reception of the balls between the load zone and the no-load zone of the ball endless track becomes smooth thereby achieving the smooth circulation of the balls.

Further, in the tube type ball screw unit, when the guide hole of each of the pair of tubular pieces establishing communication between the load rolling groove and the no-load ball path of the nut is twisted and/or bent over the range from the load rolling groove side starting end to the no-load ball path side terminating end thereof in such a manner that the guide grooves are held in a symmetrical positional relationship with each other at their starting ends on the side of the load rolling groove while they are held in the same positional relationship with each other at their terminating ends on the side of the no-load ball path, the ball coupler rolling through the ball endless track is adjusted of its posture by the change direction path whereby the balls forming part of the ball coupler do not interfere with one another and can circulate in the ball endless track smoothly in their aligned state.

In the tube type ball screw unit, when the entire length of the guide hole of each of the pair of tubular pieces forms itself a guide zone and the guide grooves of the guide hole are partly or wholly twisted and also when the guide grooves are formed at the same position over the range from the starting end to the terminating end of the tubular body connecting the pair of tubular pieces and a bent portion is formed at each of the starting and terminating ends of the tubular body, the no-load ball path can be twisted and bent as required with ease whereby the ball coupler can circulate through the no-load zone of the ball endless track in a stabilized state and at the same time, the tubular pieces and the tubular body can be constructed by using the minimum possible number of parts.

Next, the side cover type ball nut and screw unit according to the present invention will be described in detail.

The side cover type ball screw unit comprises a screw having a helical ball rolling groove on the outer peripheral surface thereof, a nut having on the inner peripheral surface thereof a helical load rolling groove opposing to the ball rolling groove of the screw and a no-load ball path, a pair of side covers mounted on the both ends of the nut and each having a change direction path forming a ball endless track by establishing communication between the load rolling groove and the no-load ball path, a number of balls rolling through the endless track and a ball coupler comprised of a series of ball coupling members capable of connecting the balls in their aligned state and retaining the balls in their rotatable state wherein a no-load zone of the endless track formed by the change direction path and the no-load ball path is provided with guide grooves for guiding the ball coupler, the ball coupler is moved by the balls in a load zone of the endless track formed by the load rolling groove while the balls are guided to move by the ball coupler in the no-load zone and guide sections for guiding the ball coupler along the progressing direction of the balls moving along the load rolling groove are provided in the change direction paths at least on the side of the load rolling groove.

Particularly, the ball coupler comprises a plurality of interposers put among the balls and a plurality of coupling members for connecting the interposers and these coupling members slidably fit with the guide grooves so as to be guided and in the guide section of each of the change direction paths they are guided in the progressing direction of the balls rolling along the load rolling grooves, that is, guided tangentially along the lead angle of the load rolling groove or the ball rolling groove.

In the above-described side cover type ball screw unit, the ball rolling groove to be formed on the outer peripheral surface of the screw may be formed circular in shape having a substantially semi-circular ball rolling surface in section or may be in the shape of a gothic arch having two intersecting substantially quadrant-like ball rolling surfaces and one or more than two such grooves may be formed in correspondence to the number of the ball rolling grooves.

The nut which screw-fits with the screw through a number of balls may be such that it is provided on the inner peripheral surface thereof with a helical load rolling groove opposing to the ball rolling groove of the screw and also it is provided with a no-load ball path for circulating the ball from one end to the other end of the load rolling groove.

Further, like the ball rolling groove of the screw, the above-described load rolling groove may be formed circular in shape having a substantially semi-circular ball rolling surface in section or in the shape of a gothic arch having two intersecting substantially quadrant-like ball rolling surfaces and one or more than two such grooves may be formed in correspondence to the number of the ball rolling grooves.

Still further, the no-load ball path to be formed in the nut may be such that it is in the form of a straight ball return hole drilled axially in the outer peripheral solid portion of the nut, or for example, a flat plate mounting surface may be formed in the outer peripheral solid portion of the nut, no-load ball grooves may be respectively drilled in both the plate mounting surface and a guide plate to be attached thereto so that when the guide plate is attached to the plate mounting surface, these no-load ball grooves are held opposite to each other to thereby form a predetermined no-load ball path.

In the present invention, the change direction path in each of the side covers is twisted and/or bent over the portion from the starting end of the path on the side of the load rolling groove up to the terminating end thereof on the side of the no-load ball path in such a manner that the guide grooves are held in a symmetrical positional relationship with each other at the starting ends thereof on the side of the load rolling groove while they are held in the same positional relationship with each other at the terminating ends thereof on the side of the no-load ball path whereby the no-load ball path which is in the form of a straight ball return hole extending along the axis of the nut can be formed easily in the other peripheral solid portion of the nut.

The means for forming each of the side covers having such change direction paths is not specifically limited but for example, there is a method in which each of the side covers is formed by a pair of return pieces each having a change direction path establishing communication between the load rolling groove and the no-load ball path of the nut and a cover body having concave portions for receiving the return pieces and fixed to each end of the nut and each of the return pieces is formed by a first and a second strips obtained by bisecting the return piece along the axis of the change direction path.

The change direction path may be formed in the above-described return piece in its entireties or a portion of the change direction path on the side of the load rolling groove may be formed in the cover body so that the portion becomes smoothly continuous with another portion of the change direction path on the side of the return piece but in that case, it is preferable that a part or the whole of the guide section be arranged in the cover body and the twisting and/or bending of the change direction path be performed on the side of the return piece when a paths of the change direction path is formed in the cover body. Further, the method of bisecting the return piece along the axis of the change direction path is also not specifically limited so that it is determined in consideration of the workability or the universality of the parts to be used.

Further, in order to make accurate and to facilitate the positioning between the change direction path to be formed in each of the side covers and the load rolling groove and no-load ball path to be formed in the nut, it is preferable that positioning bosses and concave portions for receiving such bosses be formed on each of the side covers and the nut, respectively, or more preferably, the side cover may be formed by a pair of return pieces each bisected into a first and a second strip and a cover body to receive the return pieces, a pair of semi-circular projections extending toward the nut may be formed with the first and second strips of each of the return pieces, respectively, in correspondence to the bisected change direction paths thereby forming positioning bosses on the side cover by the pair of projections formed in the first and second strips and concave portions with which the positioning bosses can fit may be formed on the nut. Thus, by the formation of the positioning bosses and the concave portions for receiving the bosses, it is possible to make accurate the positioning between the load rolling groove and the no-load ball path of the nut in the load rolling groove side and the no-load ball path side with respect to the change direction path of each side cover subjected to twisting and/or bending processes to thereby secure the smooth sliding property of each of the coupling members of the ball coupler.

As regards the ball coupler to be assembled into the ball endless track, in order that the balls may be coupled in a chain-like fashion by the coupling members lest the balls should run against one another and that the coupling members may be moved by the balls rolling along the load zone in the load zone of the endless track while the balls are guided to move by the coupling members moving along the no-load zone in the no-load zone, it is necessary for the coupling members to at least retain the balls rotatably lest the balls should fall down, so that the ball coupler is formed by a plurality of interposers to be inserted among the balls and coupling members coupling the interposers.

This ball coupler to be assembled into the ball endless track may be in the form of a single non-endless ball coupler of the above-described structure or a plurality of such ball couplers may be assembled into the ball endless track or it may be in the form of a single endless ball coupler of the above-described structure.

The side cover type ball screw unit of the present invention is constructed such that a ball coupler retaining a number of balls in their rotatable and aligned state is inserted into a ball endless track in order that the ball coupler may be moved by each of the balls in a load zone of the ball endless track and that the balls may be guided to move by the ball coupler in a no-load zone of the ball endless track and a guide section for guiding each of the balls tangentially along the progressing direction of the balls rolling in the load zone of the ball endless track is provided in each of change direction paths formed on both ends of the no-load zone leading to the load zone, the delivery and reception of the balls between the load zone and the no-load zone of the ball endless track become quite smooth thereby achieving the smooth circulation of the balls.

Further, according to such side cover type ball screw unit, when the change direction path of each of the pair of side covers for establishing communication between the load rolling grooves and the no-load ball paths of the nut is twisted and/or bent over the range from its load rolling groove side starting end to its no-load ball path side termination end in such a manner that the guide grooves at the load rolling groove side starting ends thereof are held in a symmetrical positional relationship with each other while they are held in the same positional relationship with each other at the no-load ball path side terminating ends thereof, the ball coupler traveling in the ball endless track is adjusted of its posture by the change direction path whereby the balls forming part of the ball coupler do not interfere with one another and circulate in the ball endless track smoothly in their aligned state.

Further, in this side cover type ball screw unit, when each of the side covers is formed by a pair of return pieces each having a change direction path and a cover body having concave portions for receiving the return pieces and each of the return pieces is bisected along the axis of the change direction path, it is possible to twist and/or bend the change direction path as required whereby a no-load zone of a ball endless track capable of circulating a ball coupler in a stabilized state can be formed.

BRIEF DESCRIPTION OF THE DRAWINGS

FIG. 6 is a plan view of a nut as one of components of the tube type ball screw unit shown in FIG. 1;

FIG. 7 is a simulative sectional view of an endless track of the tube type ball screw unit shown in FIG. 1;

FIG. 25 is an illustrative front view of a non-endless ball coupler assembled into the side cover type ball screw unit shown in FIG. 23;

FIG. 26 is a sectional view taken along the XXVI—XXVI line of FIG. 25;

DESCRIPTION OF REFERENCE SYMBOLS

Figure 1:
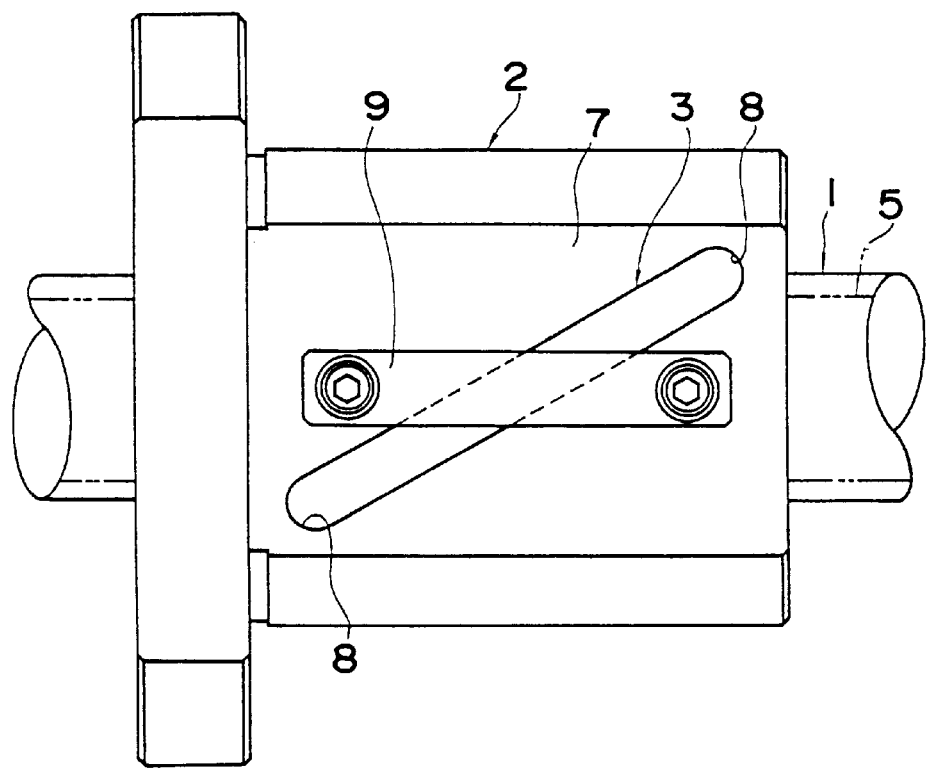
FIG. 1 is a front view of a tube type ball screw unit according to a first embodiment of the present invention.

1 ... Screw 2 ... Nut 3 ... Ball circulating tubular body 4 ... Non-endless Ball coupling body 5 ... Ball rolling groove 6 ... load rolling groove 7 ... Mounting surface 8 ... Fitting hole 9 ... Fixture 10 ... No-load ball path 10a ... Guide hole 10b ... Communication hole 11 ... Ball 12 ... Connecting section 13a and 13b (13) ... Interposers 14 ... Belt portion (connecting section) 15 ... Tubularpiece 15a ... Upper surface 15b ... Bottom surface 15c ... Stepped portion for positioning 16 ... Tubular body 16a ... Bent portion 17 ... Guide groove 18 ... Tube strip 18a ... Bent portion 119 ... Guide groove 101 ... Screw 102 ... Nut 103 ... Side cover 104 ... Non-endless ball coupler (ball coupler) 105 ... Ball rolling groove 105a and 114 ... Undercuts 106 ... Load rolling groove 107 ... Ball return hole (no-load ball path) 108 ... Change direction path 108a and 108b ... Grooves 108c ... Guide portion 109 ... Ball 110 ... Coupling member 111 ... Interposer 111a ... Retaining strips strip(interposer) 112 ... Belt section (connecting section) 113 ... Flange 115 ... Guide groove 116 ... Bolt fitting hole 117 ... Tap hole 118 ... Return piece 119 ... Concave portion 120 ... Cover body 121a ... First strip 121b ... Second strip 122 ... Positioning boss 122a and 122b ... Projections 123 ... Concave portion for positioning.

BEST MODES FOR CARRYING OUT THE INVENTION

The modes for carrying out the present invention will be described on the bases of embodiments shown in the accompanying drawings.

[First embodiment: Tube type ball screw unit]

Figure 2:
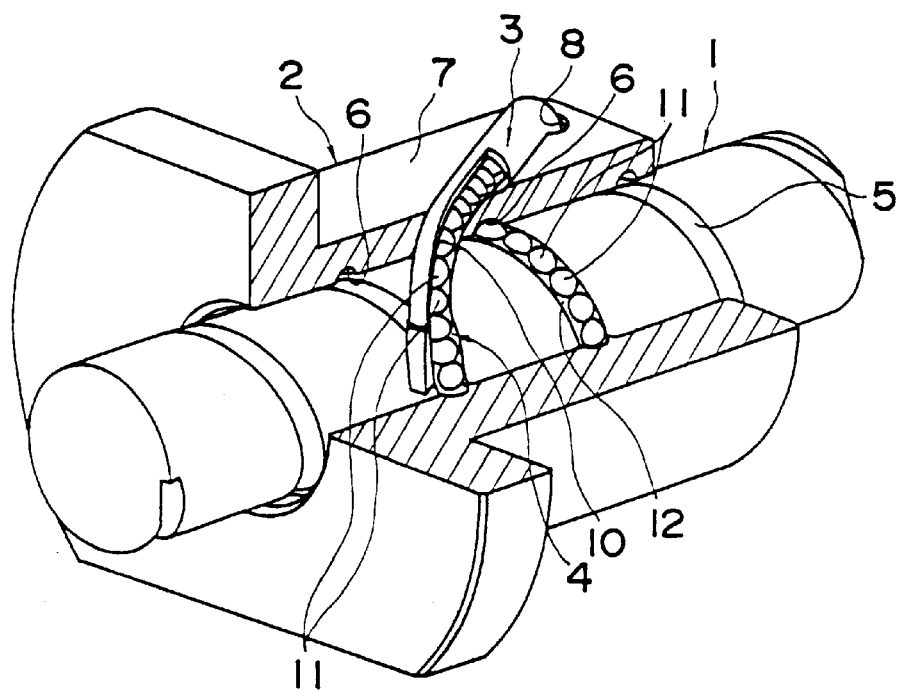
FIG. 2 is a simulative perspective view (partly cut away) of the tube type ball screw unit shown in FIG. 1 which view shows a portion of a ball endless track.

A tube type ball screw unit according to the present invention is shown in FIGS. 1 and 2. This ball screw unit basically comprises a screw 1 provided on the outer peripheral surface thereof with a helical ball rolling groove 5, a cylindrical nut 2 provided with a central through hole for receiving the screw 1, a helical load rolling groove 6 formed on the inner peripheral surface thereof so as to lie opposite to the ball rolling groove 5 of the screw 1, a flat mounting surface 7 on the outer peripheral surface thereof and a pair of fitting holes 8 drilled at positions on a diagonal line of the mounting surface 7 so as to extend from the mounting surface 7 toward a starting end and a terminating end of the load rolling groove 6, respectively, a ball circulating tubular body 3 mounted on the mounting surface 7 of the nut 2 by means of a fixture 9 and having a no-load ball path 10 which establishes communication between the starting end and the terminating end of the load rolling groove 6 of the nut 2 to thereby form an endless track and a single non-endless ball coupler 4 capable of traveling in the endless track formed by the load rolling groove 6 (a load zone) of the nut 2 and the no-load ball path 10 (a no-load zone) of the ball circulating tubular body 3 fixed to the nut 2. The ball coupler 4 comprises a number of balls 11 and a plurality of flexible coupling members 12 made of a synthetic resin material and adapted to couple the balls 11 in a chain-like fashion. It should be noted that in FIG. 2, the ball coupler 4 is depicted simulatively so that the twisting of the ball coupling members 12 can be understood easily.

Figure 3:
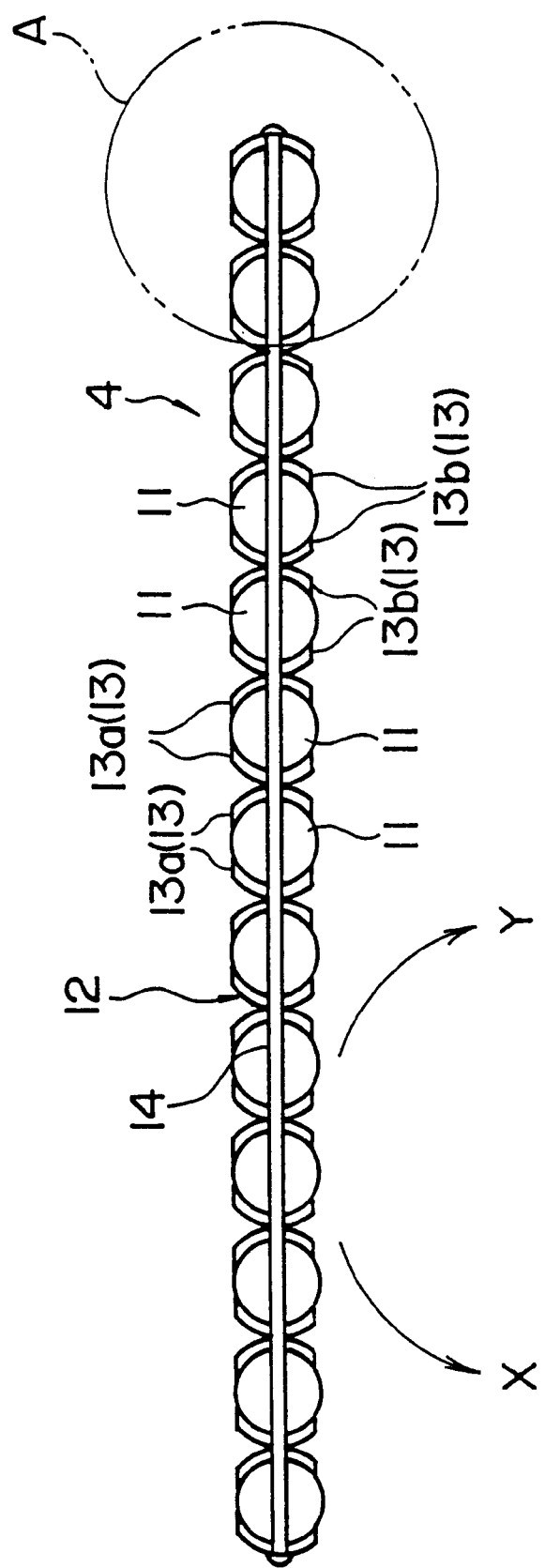
FIG. 3 is an illustrative front view of a non-endless ball coupler assembled into the tube type ball screw unit shown in FIG. 1.
Figure 4:
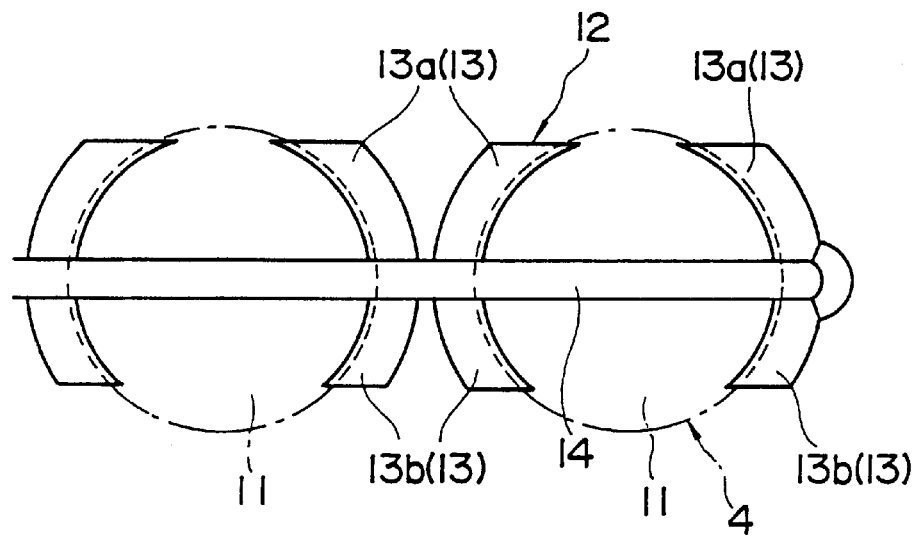
FIG. 4 is a partially enlarged view of an A-portion of the ball coupler shown in FIG. 3.
Figure 5:
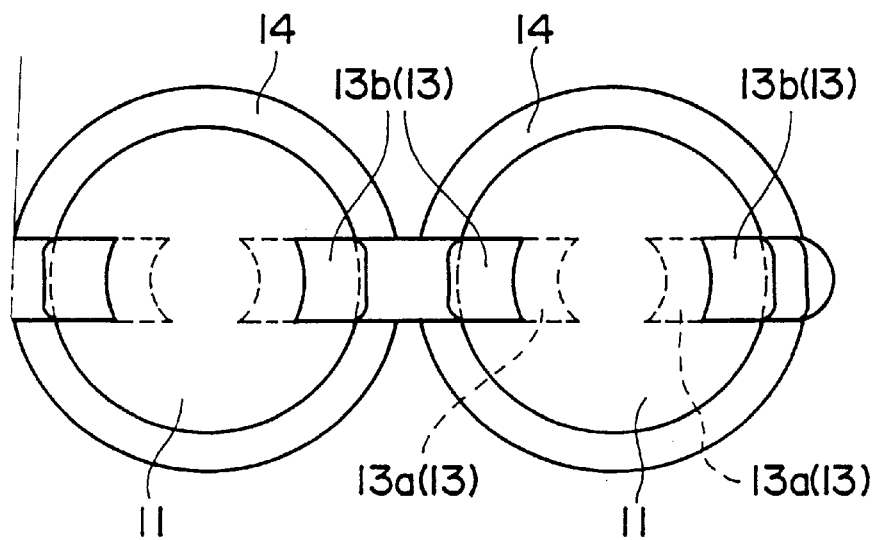
FIG. 5 is a bottom view of the A-portion of the ball coupler shown in FIG. 4.

In the first embodiment, the ball coupler 4 is, as shown in FIGS. 3 through 5, formed of the coupling members 12 each comprised of two kinds of claw-like interposing strips 13a and 13b (forming the interposer 13) of different lengths extending vertically along the spherical surface of each of the balls 11 and interposed among the balls 11 and a couple of belts (connecting sections) 14 for connecting the interposers 13 horizontally along the spherical surfaces of the balls 11. When the non-endless ball coupler 4 is curved, each of the interposers 13 is so formed that the claw-like interposing strip 13a located outside is longer than the claw-like interposing strip 13b located inside so that when the longitudinal coupler 4 is curved, each of the balls 11 is retained by each of these interposers 13 and the couple of belts 14 thereby preventing the balls from falling off and allowing the interposers 13 to be bent easily in a direction XY designated by the arrow with the shorter claw-like interposing strip 13b being held located inside.

The non-endless ball coupler 4 is formed in such a manner that the balls 11 are arranged within a mold as cores, a fused synthetic resin is injected into the mold to thereby insert-molding the cores, the insert-molded material is released from the mold to produce a molded non-endless ball coupler 4 comprising a plurality of coupling members 12, then the coupler 4 is immersed into a mineral lubricating oil to cause the coupling members 12 to become swelled to provide a gap between each of the balls 11 and each of the coupling members 12 so that each of the balls 11 can rotate freely while it is retained by each of the coupling members 12.

Figure 8:
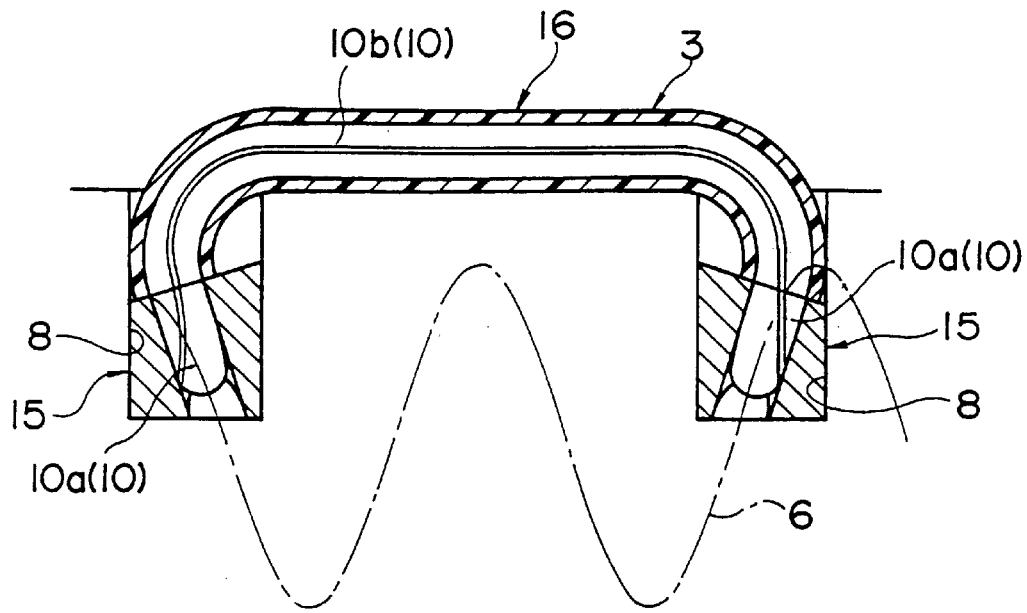
FIG. 8 is a simulative sectional view of a no-load ball path formed by the nut and a ball circulating tubular body of the tube type ball screw unit shown in FIG. 1.

As shown in FIGS. 6 through 8, The ball circulating tubular body 3 comprises a pair of tubular pieces 15 to be fitted into a pair of fitting holes 8 formed in the nut 2 and a tubular body 16 connecting the tubular pieces 15 so as to establish communication between the tubular pieces 15. Further, the no-load ball path 10 forming the endless track for the balls 11 comprises communication holes 10a respectively formed in the pair of tubular pieces 15 and a communication 10b formed in the tubular body 16.

Figure 9:
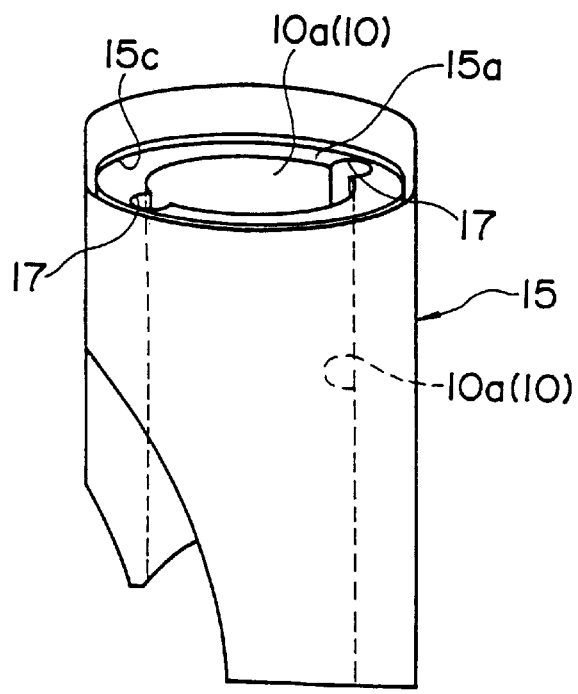
FIG. 9 is a perspective view of a tubular piece forming part of the endless track shown in FIG. 7.
Figure 10:
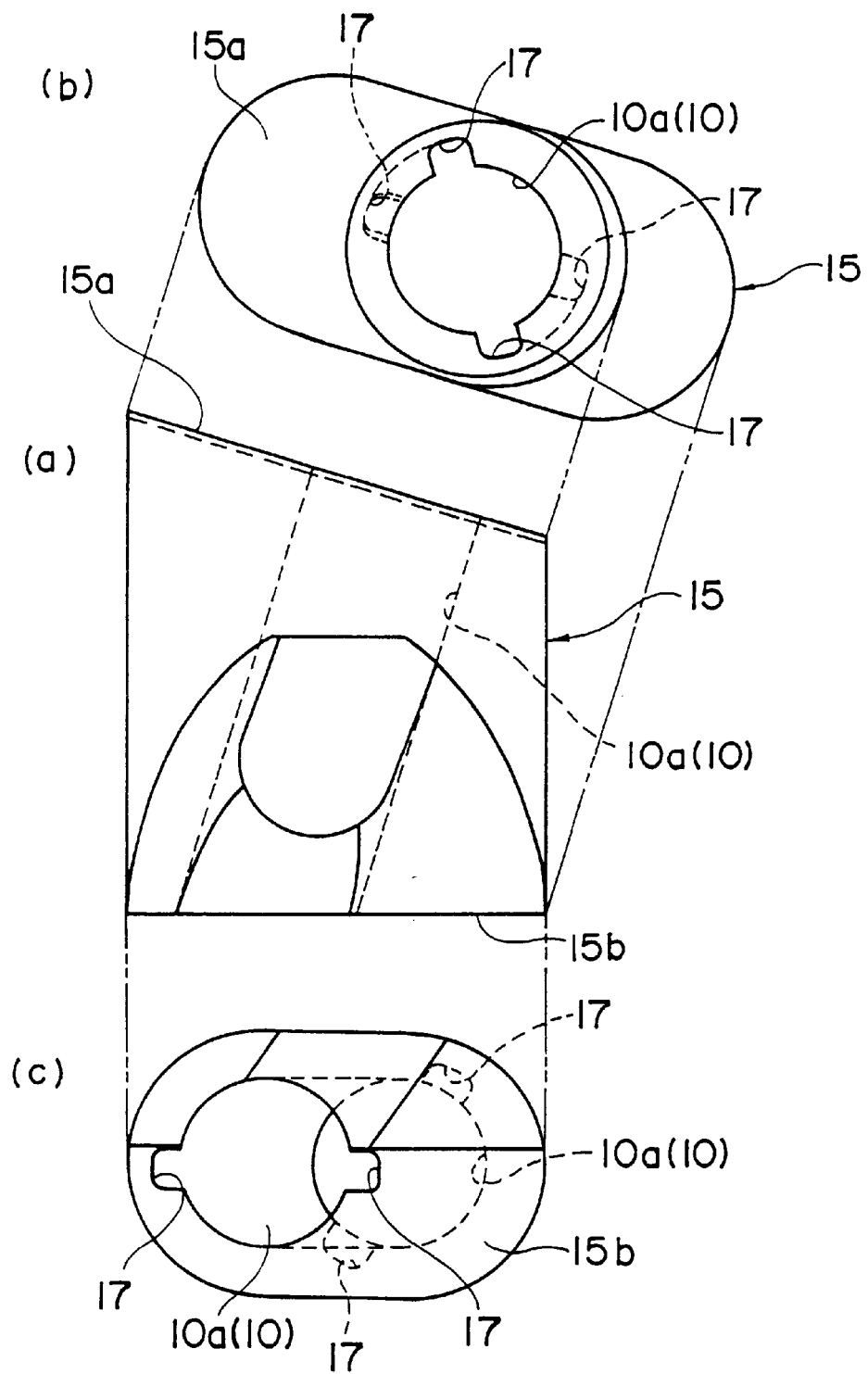
FIG. 10 illustrates the tube piece shown in FIG. 9, wherein FIG. 10(*a*) is a front view of the tubular piece, FIG. 10(*b*) is a plan view of the same and FIG. 10(*c*) is a bottom view of the same.
Figure 11:
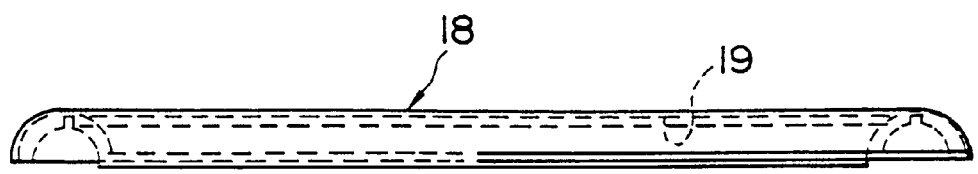
FIG. 11 is a plan view of one of tubular pieces forming a tubular body shown in FIG. 8.
Figure 12:
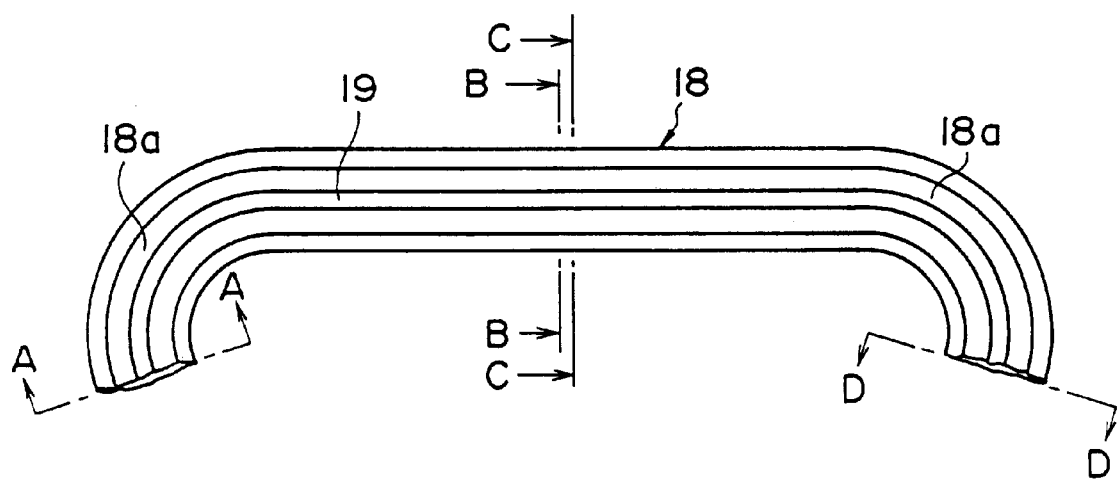
FIG. 12 is a front view of the tubular piece shown in FIG. 11.

In this first embodiment, the pair of tubular pieces 15 are molded to the same shape such that as shown in FIGS. 8 through 10, each of the tubular pieces 15 is substantially in the shape of an elliptical cylinder made of a sintered metal with its upper surface 15a inclined in the longitudinal direction and a bottom surface 15b and each of the guide holes 10a formed in the tubular pieces 15 forms in its entireties a guide zone extending tangentially along the lead angle of the load rolling groove 6 of the nut 2 from the bottom surface 15b toward the upper surface 15a of the tubular piece 15. Further, the guide hole 10a is provided with a pair of guide grooves 17 with which the connecting sections 14 of the coupling members 12 of the ball coupler 4 slidably fit to be guided thereby guiding the coupling member 12 of the ball coupler 4. The guide grooves 17 are held opposite to each other anywhere in the guide hole 10a and are twisted by a predetermined angle over the range from their starting ends on the side of the load rolling groove 6 of the nut 2 (on the side of the bottom surface 15b of the tubular piece 15) toward their terminating ends on the side of the communication hole 10b of the tubular body 16 (on the side of the upper surface 15a of the tubular piece 15) whereby when the tubular pieces 15 are assembled into the nut 2, the guide grooves 17 which are held in symmetrical positional relationship with each other in the pair of tubular pieces 15 are held in the same positional relationship with each other at their terminating ends on the side of the communication hole 10b.

Each of the fitting holes 8 in the nut 2 is formed substantially elliptical in correspondence to the outer configuration of each of the tubular pieces 15 and the depth thereof is made larger than the length of each of the tubular pieces 15 so that by fitting the tubular pieces 15 into the fitting holes 8, respectively, the tubular pieces 15 are positioned with respect to the nut 2. Further, on the upper surface 15a of each of the tubular pieces 15 there is formed a stepped portion 15c for positioning each of the ends of the tubular body 16 such that when the bent portions 16a formed respectively at the starting end and the terminating end of the tubular body 16 are inserted into the fitting holes 8, the top ends of the bent portions 16a engage the stepped portions 15c, respectively, and further, when the tubular body 16 is fixed to the mounting surface 7 of the nut 2 by means of a fixture 9, the pair of tubular pieces 15 and the tubular body 16 are fixed to the nut 2.

In this case, as shown in FIGS. 11 through 16, the tubular body 16 is formed of a pair of synthetic resin tube strips 18 having quite the same shape and at both ends of each of the strips 18, there are formed bent portions 18a, respectively, which form the bent portions 16a of the tubular body 16. Further, there is formed, along the central portion of the inner surface of each of the tube strips 18, a guide groove 19 into which each of the connecting sections 14 connecting the coupling members 12 of the ball coupler 4 slidably fits.

Figure 13:
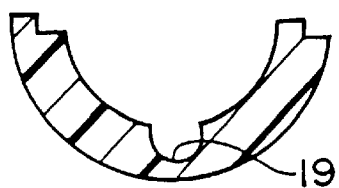
FIG. 13 is a sectional view of the tubular piece shown in FIG. 12 when taken along the A–B line thereof.
Figure 14:
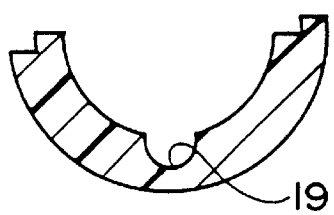
FIG. 14 is a sectional view of the tubular piece shown in FIG. 12 when taken along the C–D line thereof.
Figure 15:
FIG. 15 is a sectional view of the tubular piece shown in FIG. 12 when taken along the B–C line thereof.
Figure 16:
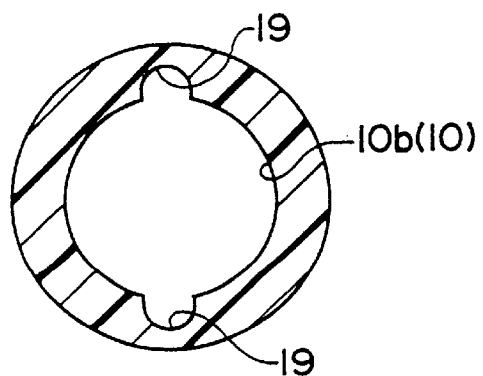
FIG. 16 is a sectional view of the ball circulating tubular body shown in FIG. 8.

In this first instant embodiment, in order for the pair of tube strips 18 to have quite the same shape, each of the strips 18 is made to have such cross-sectional configurations that in the region A→B, it has a cross-section as shown in FIG. 13, in the region C→D, it has a cross-section as shown in FIG. 14 and in the region B→C, it has a cross-section as shown in FIG. 15 so that when the pair of such tube strips 18 are combined with each other to form the tubular body 16, the pair of guide grooves 19 are present on the inner surface of the communication holes 10a of the tubular body 16 in opposite relationship with each other as shown in FIG. 16.

Figure 17:
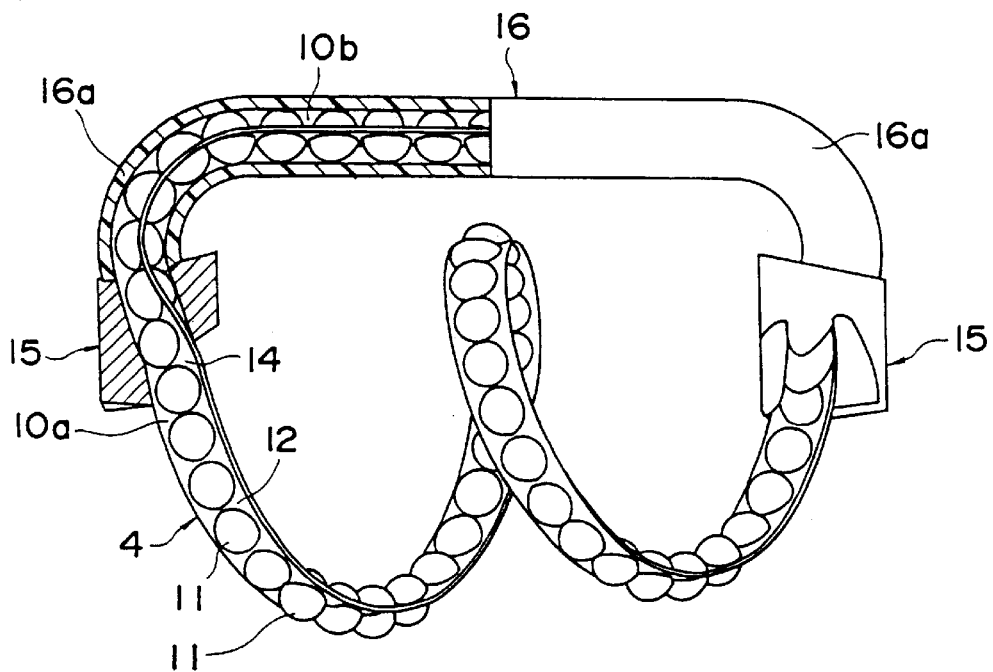
FIG. 17 is a simulative perspective view (partly in section) of the ball endless track of the tube type ball screw unit shown in FIG. 1.
Figure 18:
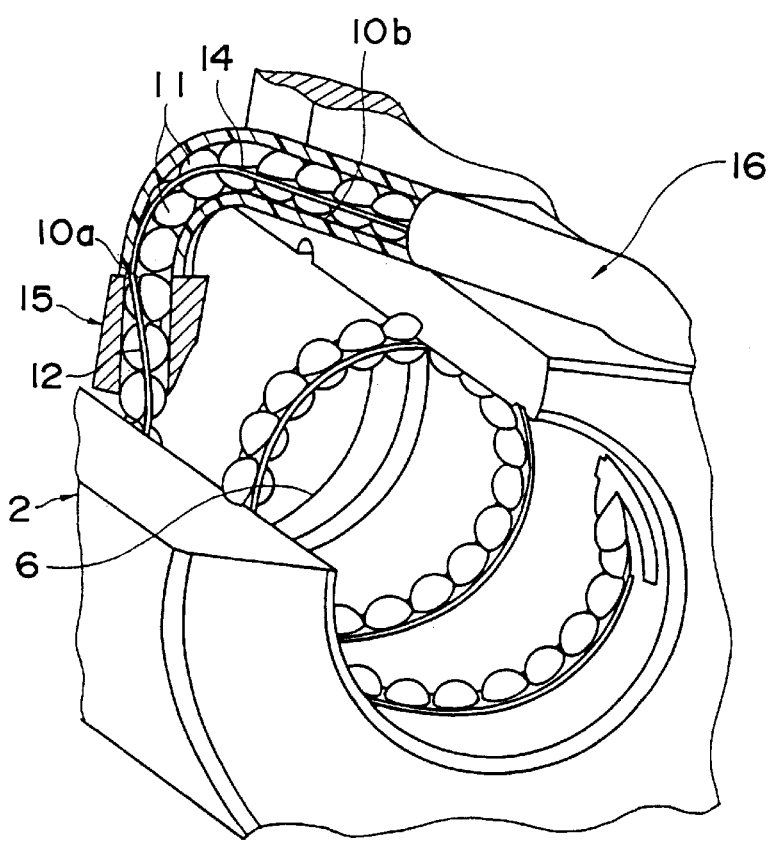
FIG. 18 is a perspective view (partly in section) of the non-endless ball coupler traveling within a load rolling groove of the nut of the tube type ball screw unit shown in FIG. 1.
Figure 19:
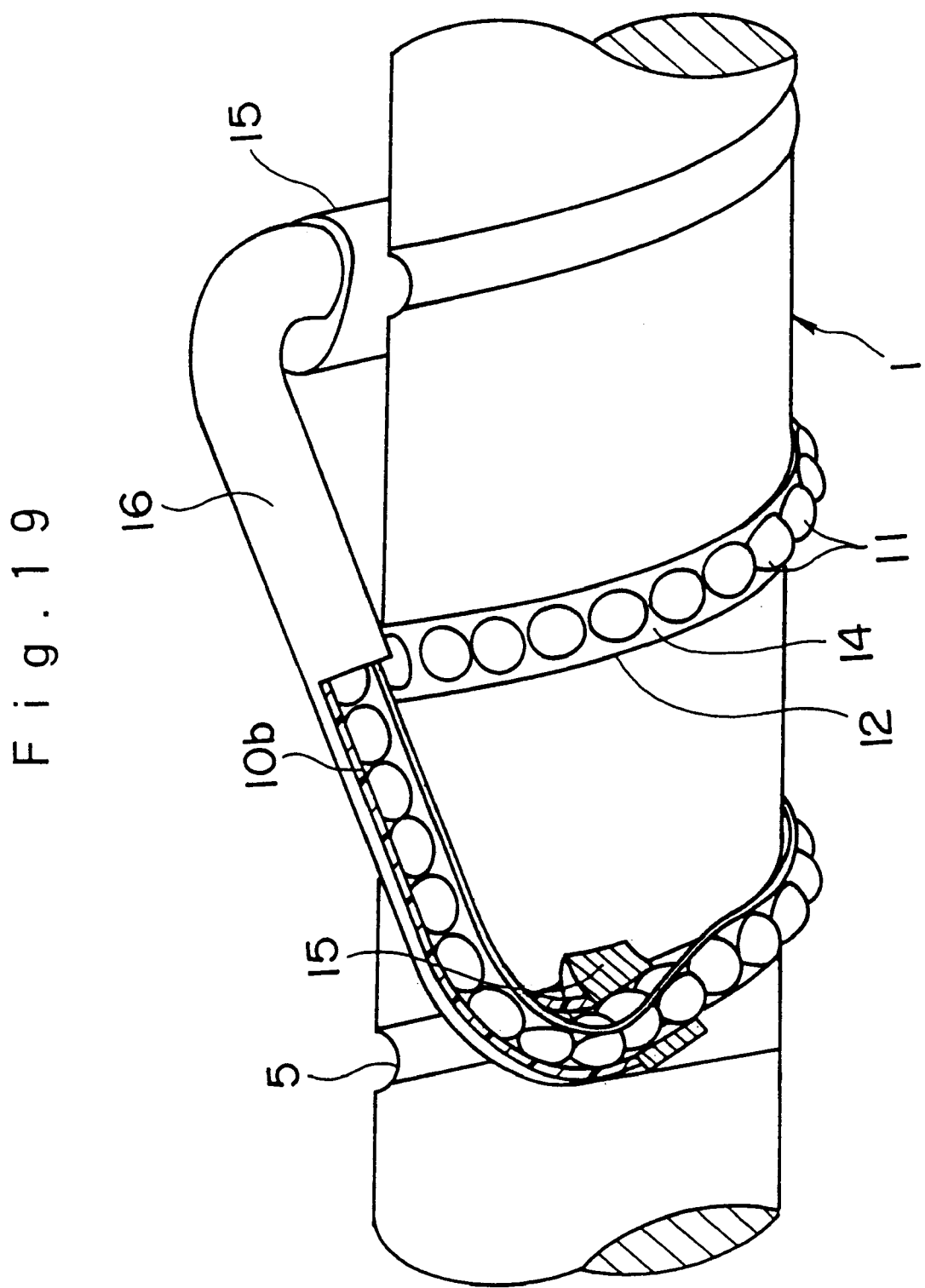
FIG. 19 is a perspective view (partly in section) of the non-endless ball coupler traveling along the ball rolling groove of the screw forming part of the tube type ball screw unit shown in FIG. 1.

In this first embodiment, the relationship between the endless track formed by the load rolling groove 6 (load zone) of the nut 2 and the no-load ball path 10 (no-loaded zone) of the ball circulating tubular body 3 formed by the guide holes a of the pair of tubular pieces 15 and the communication hole 10b of the tubular body 16, and the non-endless ball coupler 4 traveling through the endless track is simulatively shown in FIGS. 17 through 19. That is, FIG. 17 shows the movement and the posture of the non-endless ball coupler 4 within the endless track, especially the manner of how the coupler 4 is twisted within the guide holes Oa and bent at the bent portions 16a of the tubular body 16, FIG. 18 shows the condition of the non-endless ball coupler 4 traveling along the load rolling groove 6 of the nut 2 and FIG. 19 shows the condition of the non-endless ball coupler 4 traveling along the ball rolling groove 5 of the screw 1. In these FIGS. 17 through 19, the non-endless ball coupler 4 is depicted simulatively so that the twisting of the coupling members 12 may be understood easily. The connecting sections 14 connecting the coupling members 12 of the ball coupler 4 traveling through the endless track are held symmetrical with each other in position immediately before the ball coupler 4 enters each of the guide holes 10a of the tubular pieces 15 or immediately after it comes out of each guide hole 10a (the starting and terminating ends of the load rolling groove 6) but they are twisted by a predetermined angle within the guide holes 10a of the tubular pieces 15 and come to be held in the same positional relationship with each other immediately before the outlets of the guide holes 10a of the tubular pieces 15 on the sides of the tubular body 16 and in the communication hole 10b of the tubular body 16 having the bent portions 16a at both ends thereof, they are held in the same positional relationship with each other from the starting ends to the terminating ends of the communication hole 10b.

Accordingly, in this first embodiment, the guide hole 10a of each of the pair of tubular pieces 15 forms itself a guide zone extending tangentially along the lead angle of the load rolling groove 6 of the nut 2 whereby the delivery and reception of the balls 11 between the load zone and the no-load zone of the endless track become smooth, a predetermined twisting process is performed at each of the pair of tubular pieces 15 and a predetermined bending process is performed at both ends of the tubular body 16 so that the ball couplers 4 roll smoothly within the endless track thereby achieving the smooth circulation of the balls.

[Second embodiment: A tube type ball screw unit]

Figure 20:
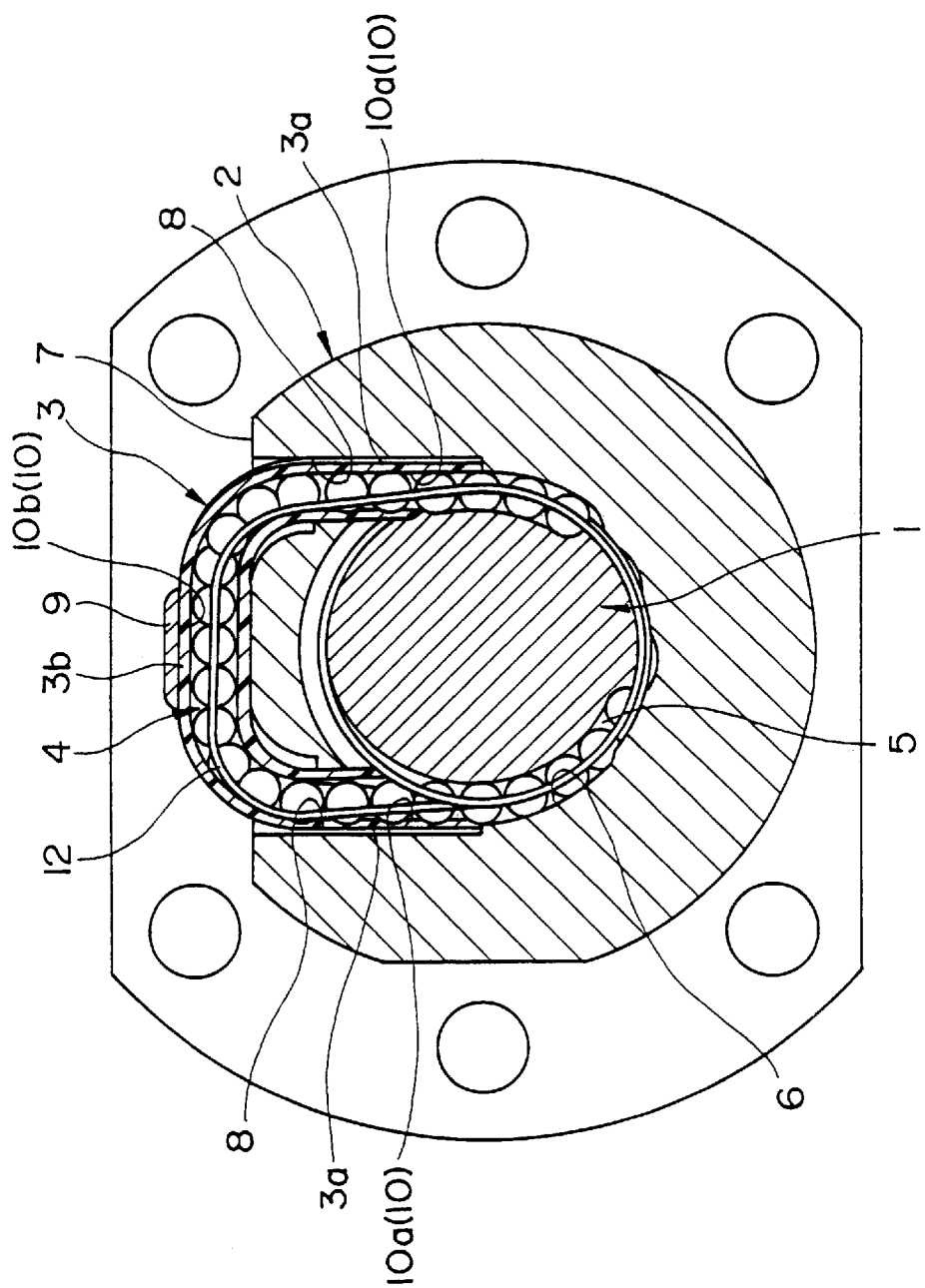
FIG. 20 is an illustrative sectional view of a tube type ball screw unit according to a second embodiment of the present invention with the view being similar to FIG. 7.
Figure 21:
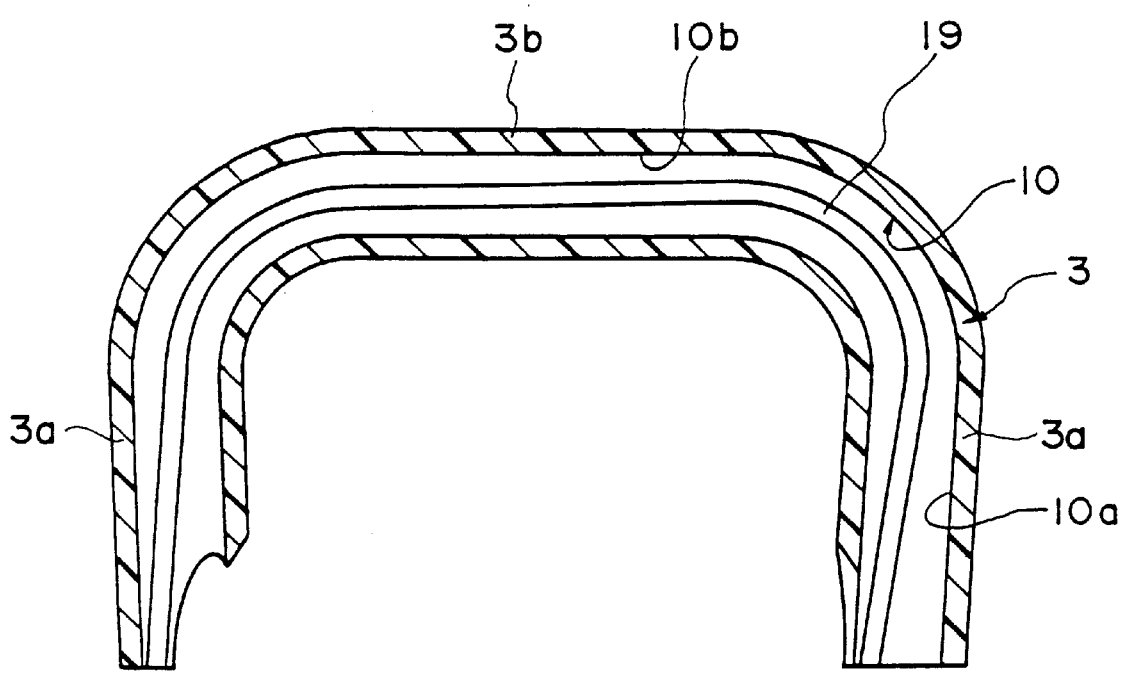
FIG. 21 is an illustrative sectional view of a ball circulating tubular body forming part of the ball screw unit shown in FIG. 20.
Figure 22:
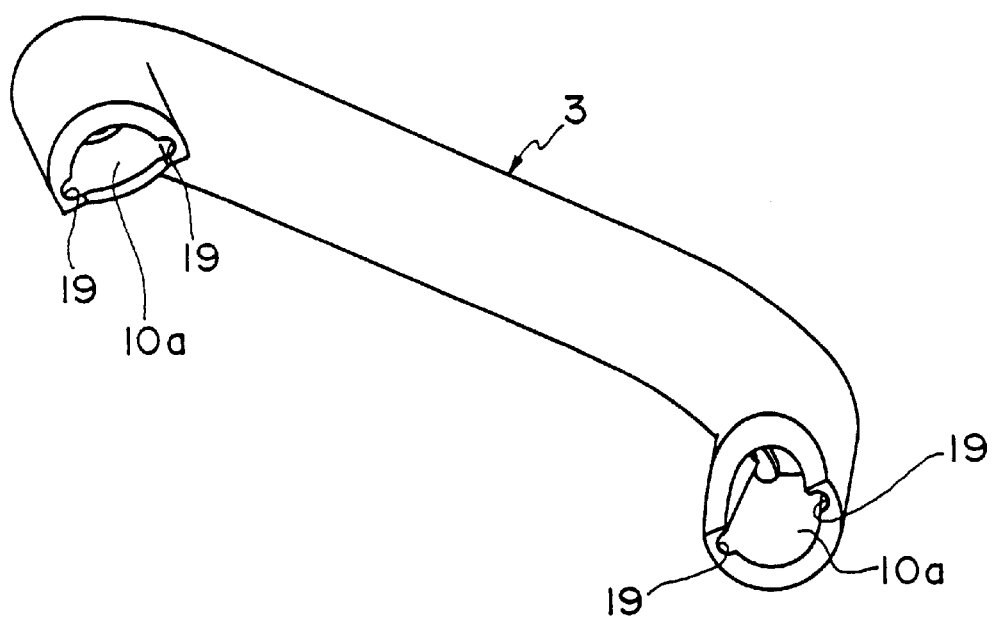
FIG. 22 is a perspective view of the ball circulating tubular body of the ball screw unit of FIG. 20.

FIGS. 20 through 22 concern a tube type ball screw unit as in the case of the first embodiment but unlike the first embodiment, the whole of the ball circulating tubular body 3 is in the shape of a substantially U-shaped tube having both ends 3a thereof fixedly fitted into a pair of fitting holes 8 formed in the nut 2. Further, the ball circulating tubular body 3 is provided with guide holes 10a at both ends 3a thereof as in the case of the tubular piece 15 of the first embodiment and at the central portion 3b thereof there is provided a communication hole 10b as in the case of the tubular body 16 of the first embodiment so that these guide holes 10a and the communication hole 10b form themselves a no-load ball path 10 for forming a no-loaded zone of the endless track for the balls 11.

In this second embodiment, the guide holes 10a which are respectively formed at both ends 3a of the tubular body 3 form themselves guide zones each extending tangentially along the lead angle of the load rolling groove 6 of the nut 2 and further, each of the guide holes 10a is provided with a pair of guide grooves 19 with which the connecting sections 14 connecting the coupling members 12 of the ball coupler 4 slidably fit so as to allow the coupling members 12 of the ball coupler 4 to be guided thereby. These guide grooves 19 lie opposite to each other within each of the guide holes 10a and are twisted by a predetermined angle over the range from the load rolling groove 6 of the nut 2 to the communication hole 10b whereby when both ends 3a of the ball circulating tubular body 3 are assembled into the nut 2, the guide grooves 19 which are in symmetrical positional relationship with each other at both ends 3a thereof are held in the same positional relationship with each other on the sides of the communication holes 10b.

Accordingly, in this second embodiment, the guide holes 10a of both ends 3a of the ball circulating tubular body 3 form themselves the guide zones each extending tangentially along the lead angle of the load rolling groove 6 of the nut 2 whereby the delivery and reception of the balls 11 between the load zone and the no-load zone of the endless track become smooth, a predetermined twisting process is performed at both ends 3a of the ball circulating tubular body 3 and a predetermined bending process is performed over the range from both ends 3a toward the central portion 3b of the body 3 so that the ball coupler 4 smoothly travels within the endless track thereby achieving the smooth circulation of the balls 11.

[Third embodiment: Side cover type ball screw unit]

Figure 23:
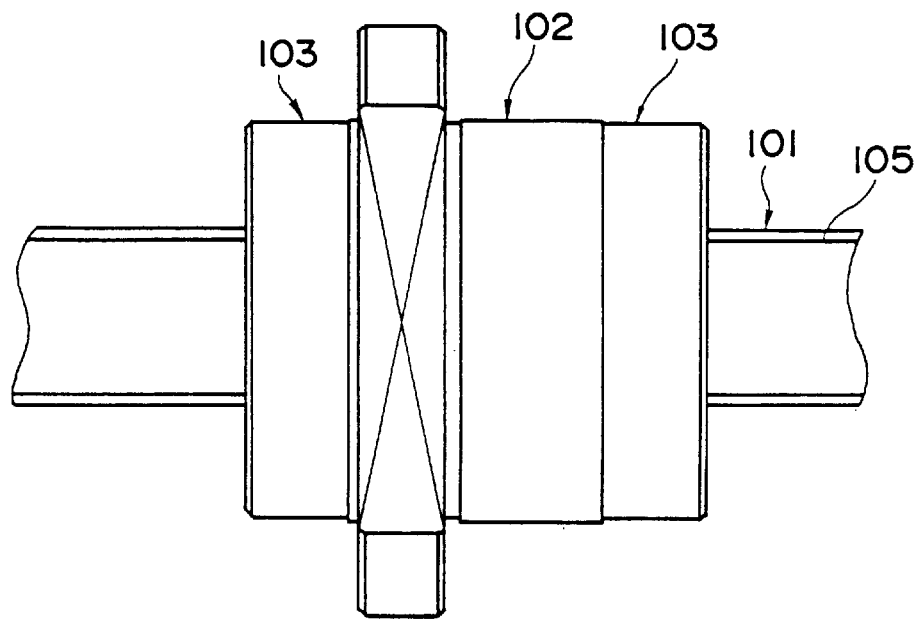
FIG. 23 is a front view of a side cover type ball screw unit according to a third embodiment of the present invention.
Figure 24:
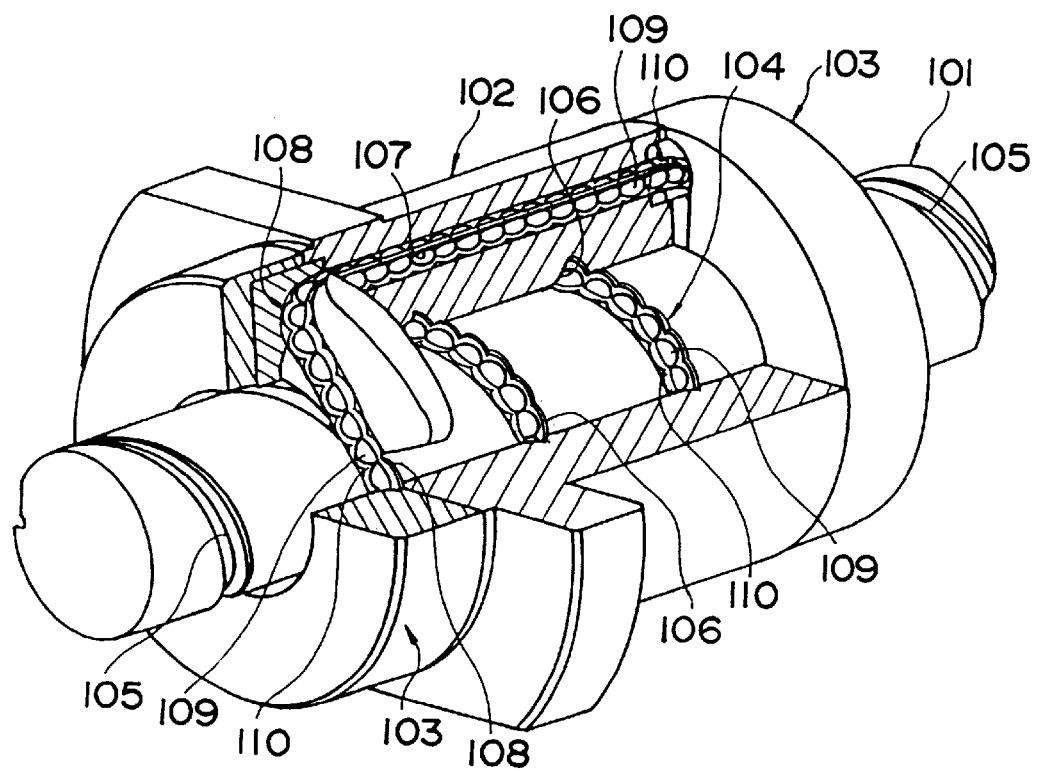
FIG. 24 is a simulative perspective view (partly cut away) of a ball endless track of the side cover type ball screw unit shown in FIG. 23.
Figure 2:
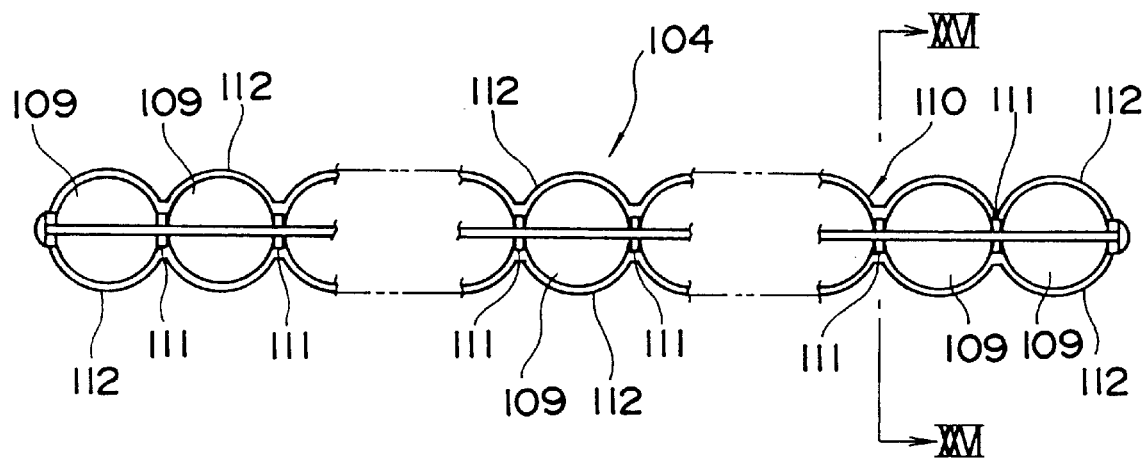
Figure 2:
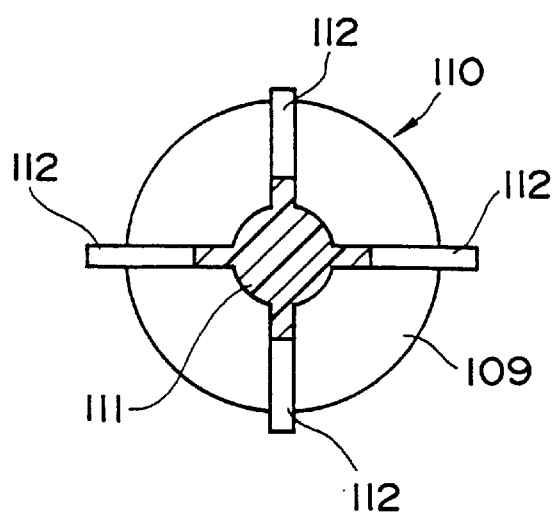

FIGS. 23 and 24 show a side cover type ball screw unit according to the present invention. This ball screw unit basically comprises a screw 101 having two helical ball rolling grooves 105 on the outer peripheral surface thereof, a nut 102 in the form of a cylinder having a through hole at the center thereof for receiving the screw 101, two helical load rolling grooves 106 on the inner peripheral surface thereof in opposite relationship with the two helical ball rolling grooves 105 of the screw 101 and two ball return holes (no load ball paths) 107 formed at opposing positions at an outer peripheral solid portion thereof and adapted to circulate balls 109 from one end of the load rolling groove 106 to the other end thereof along the axial direction; a pair of side covers 103 mounted on the both ends of the nut 102 and having two change direction paths 108 for establishing communication between the load rolling groove 106 of the nut 102 and the ball return holes 107 to thereby form an endless track and two non-endless ball couplers 104 rolling within a total of two endless tracks formed by one of the load rolling grooves 106 of the nut 102 (load zone), one of the ball return holes 107 of the nut 102 (no-load zone) and the two change direction paths 108 (no-load zone) respectively formed in the pair of side covers 103. Each of these longitudinal ball couplers 104 is formed by a number of balls 109 and a number of synthetic resin flexible coupling members 110 each having two ends and adapted to couple the balls 109 in a chain-like fashion. It should be noted that in FIG. 24, each of the ball couplers 104 is simulatively depicted so that the twisting of the coupling members 110 can be understood easily.

In this third embodiment, each of the non-endless ball couplers 104 comprises, as shown in FIGS. 25 and 26, the coupling members 110, the disk-like interposers 111 put among the balls 109 and four belts (connecting sections) 112 each extending along, and contacting, the spherical surface of each of the balls 109 lying among disk-like interposers 111 and arranged vertically and horizontally at equal intervals of 90°. Therefore, when it is observed as a whole, it is most constricted at each of the interposers 111. Thus, the balls 109 are coupled in a chain-like fashion at the belt section 112 and are prevented from coming into contact with one another at each of the interposers 111 and from falling off from the coupling member 111 by the presence of the interposers 110 and the belt-like connecting portions 112.

The ball coupler 104 is formed in such a manner that the balls 109 are arranged in a line as a core within a mold, a molten synthetic resin is injected into the mold to thereby insert-molding the ball coupler 104, the molded ball coupler 104 is released from the mold and immersed into a mineral lubricating oil to get each of the molded coupling members 110 swollen so that a gap is formed between each of the balls 109 and each of the coupling member 110 whereby each of the balls 109 can rotate freely while it is retained by the coupling member 110.

The ball coupler 104 is most constricted at the interposer 111 of the coupling member 110 so that it can be bent in any direction, for example, in FIG. 26 it can be bent not only in a direction between the two adjoining belt portions 112 but also in a direction of each of the belt-like connecting sections 112. Further, even when it is twisted, it can be deformed to follow such twisting and further, even when it is twisted or bent, it can retain each of the balls 109 securely lest the ball should come off.

Further, in this third embodiment, the screw 101 is provided with a relief groove 105a for slidably receiving the belt-like connecting sections 112 which connects the coupling members 110 forming the ball coupler 104, along the deepest portion of the ball rolling groove 105. (refer to FIGS. 37(a) through (e)).

Figure 27:
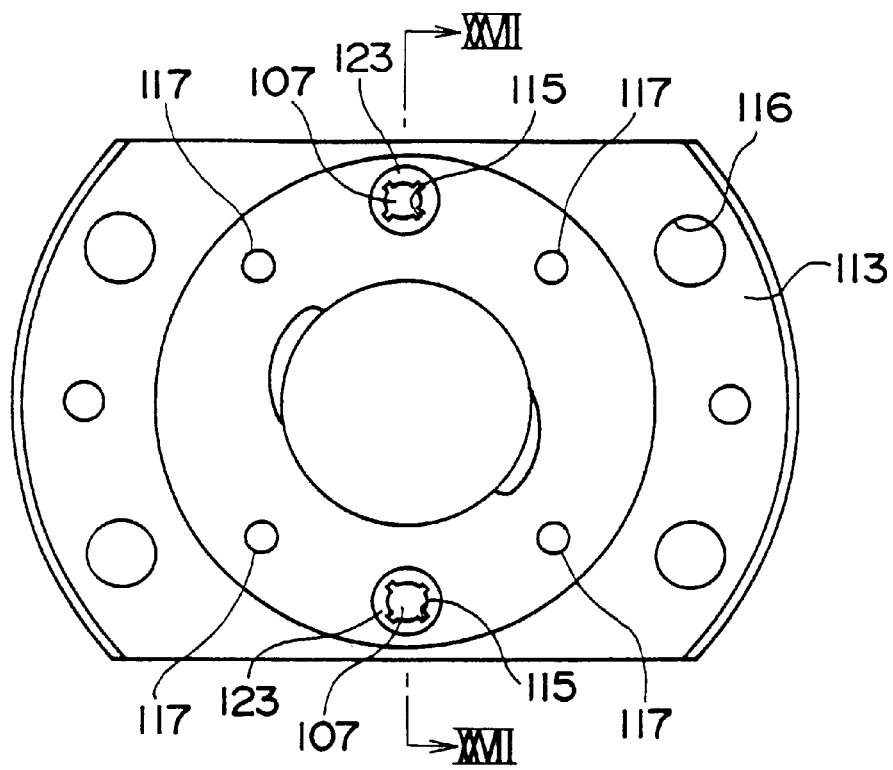
FIG. 27 is a front view of a nut forming part of the side cover type ball screw unit of FIG. 23.
Figure 28:
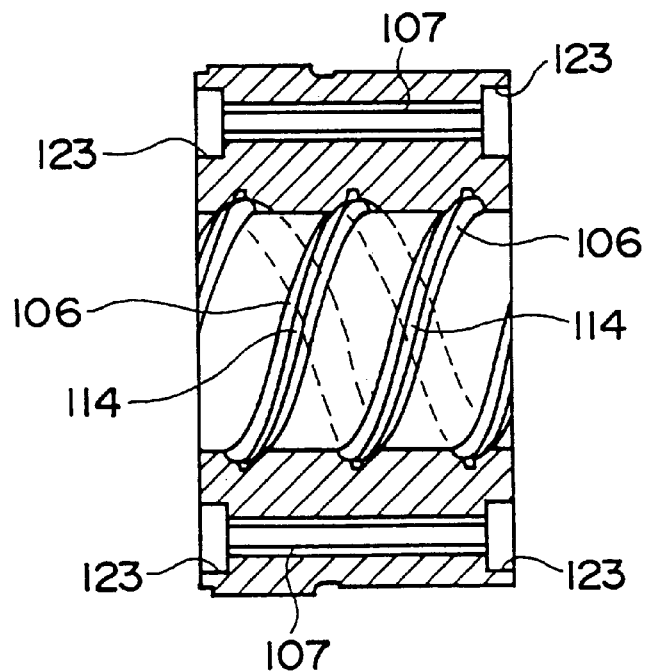
FIG. 28 is a sectional view taken along the XXVIII—XXVIII line of FIG. 27.

Still further, as shown in FIGS. 27 and 28, the nut 102 is provided with a flange 113 projecting from the outer peripheral surface thereof so as to allow the nut 102 to be fixed to a movable body such as a table. The helical load rolling groove 106 opposing to the ball rolling groove 105 of the screw 101 is in the shape of a gothic arch formed by two intersecting ball rolling surfaces and at the deepest portion of the groove there is provided a relief groove 114 for slidably receiving the four belt-like connecting sections 112 of the ball coupler 104. Further, the ball return hole 107 is provided with a guide groove 115 for guiding each of the coupling members 110 when the four belts 112 of the ball coupler 1 is slidably fitted therein. It should be noted that in FIG. 27, reference numeral 116 designates a bolt fitting hole drilled in the flange 113 and reference numeral 117 designates a tapped hole into which a fixing screw for fixing each of the side covers 103 is screw-fitted.

Figure 29:
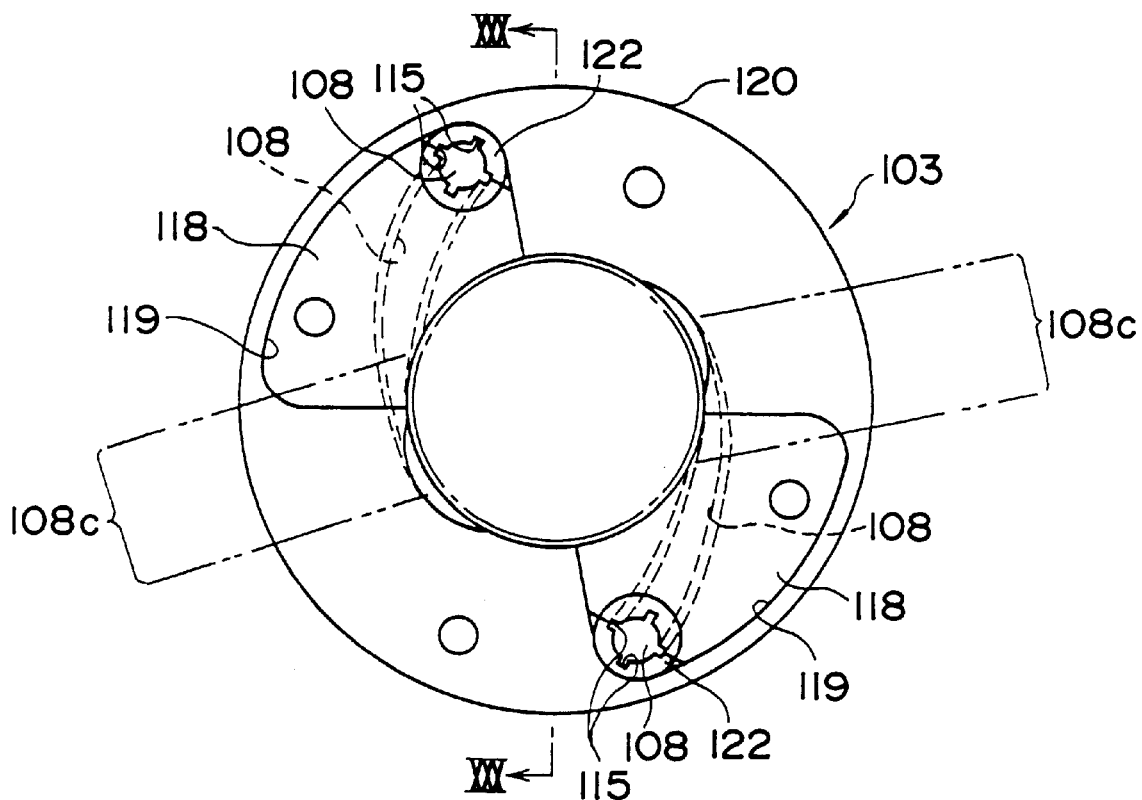
FIG. 29 is an internal back view of one of side covers of the side cover type ball screw unit shown in FIG. 23.
Figure 30:
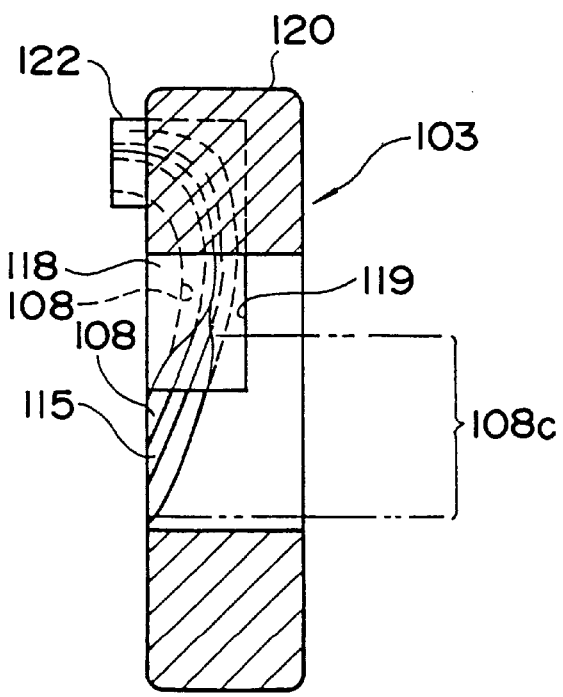
FIG. 30 is a sectional view taken along the XXX—XXX line of FIG. 29.
Figure 31:
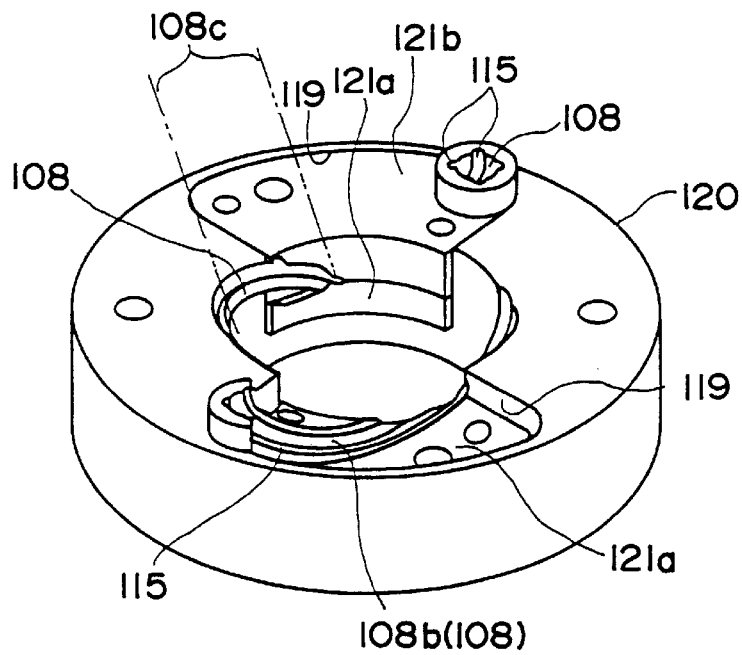
FIG. 31 is a perspective view of the side cover shown in FIG. 29 when taken from inside thereof with a second strip of a return piece being omitted.

Next, each of the side covers 103 to be fixed to both ends of the nut 102 is, as shown in FIGS. 29 through 31, in the form of a doughnut having at the central portion thereof a through hole corresponding to the through hole of the nut 102 and comprises a pair of return pieces 118 each covering the greater part of each of the change direction paths 108 which establish communication between the load rolling grooves 106 and the ball return holes 107 of the nut 102 and a pair of cover bodies 120 each having substantially fan-shaped concave portions 119 for housing the return pieces 118 and a portion of each of the change direction paths 108 on the side of each of the load rolling grooves 106 and fixed to both ends of the nut 102, respectively. Further, each of the return pieces 118 comprises a first and a second strips 121a and 121b so divided as to bisect the change direction path 108 along the axis of the latter.

The change direction path 108 of each of the return pieces 118 is provided, on the nut 102 on the side of the load rolling groove 106, with a guide section 118c as a zone extending linearly in the tangential direction along the lead angle of the load rolling groove 106 whereby the coupling member 110 retaining the ball 109 coming out from the load zone formed by the load rolling groove 106 of the nut 102 is guided by the guide section 118c substantially linearly in the tangential direction along the lead angle of the load rolling groove 106 so that each of the balls 109 is guided as it is at the guide section 118c along its progressing direction of the ball 109 rolling through the load rolling groove 106.

In the third embodiment, a portion of the guide section 118c of the change direction path 108 is formed on the side of the cover body 120 so as to become continuous with the remaining portion of the guide section 118c formed on the side of the return piece 118. Further, the twisting and bending processes for the pair of change direction paths 108 are performed on the side of each of the return pieces 118 and by these processes the change direction paths 108 of the pair of cover bodies 103 are so formed that the guide grooves 115 at the starting end of the load rolling groove 106 are held symmetrical with each other in position and the guide grooves 115 on the terminating end of the ball return hole 107 are also held in the same positional relationship with each other.

Figure 32:
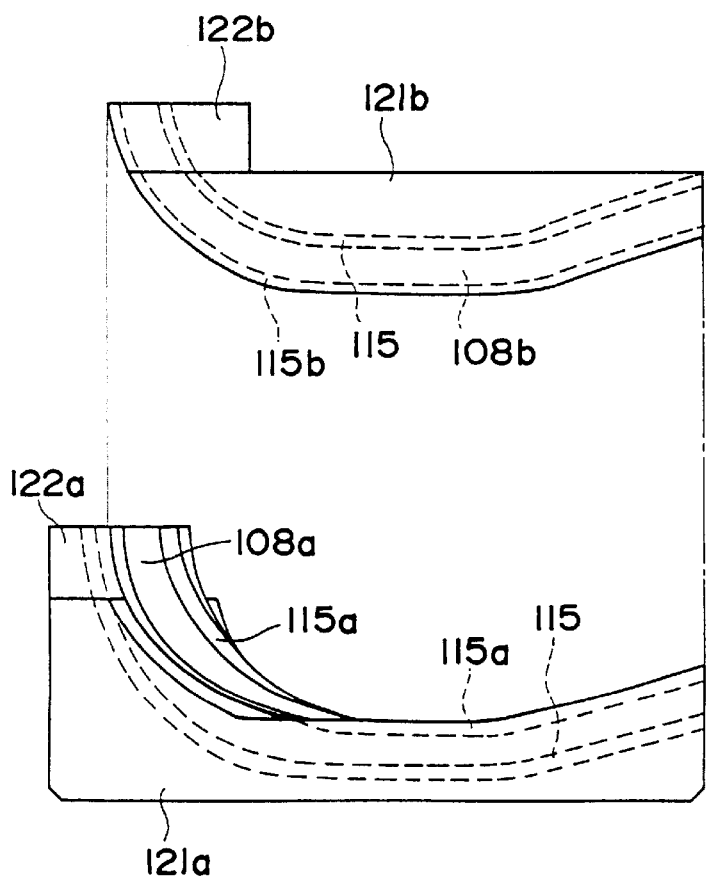
FIG. 32 is a front view of a first strip and the second strip of the return piece shown in FIG. 31.
Figure 33:
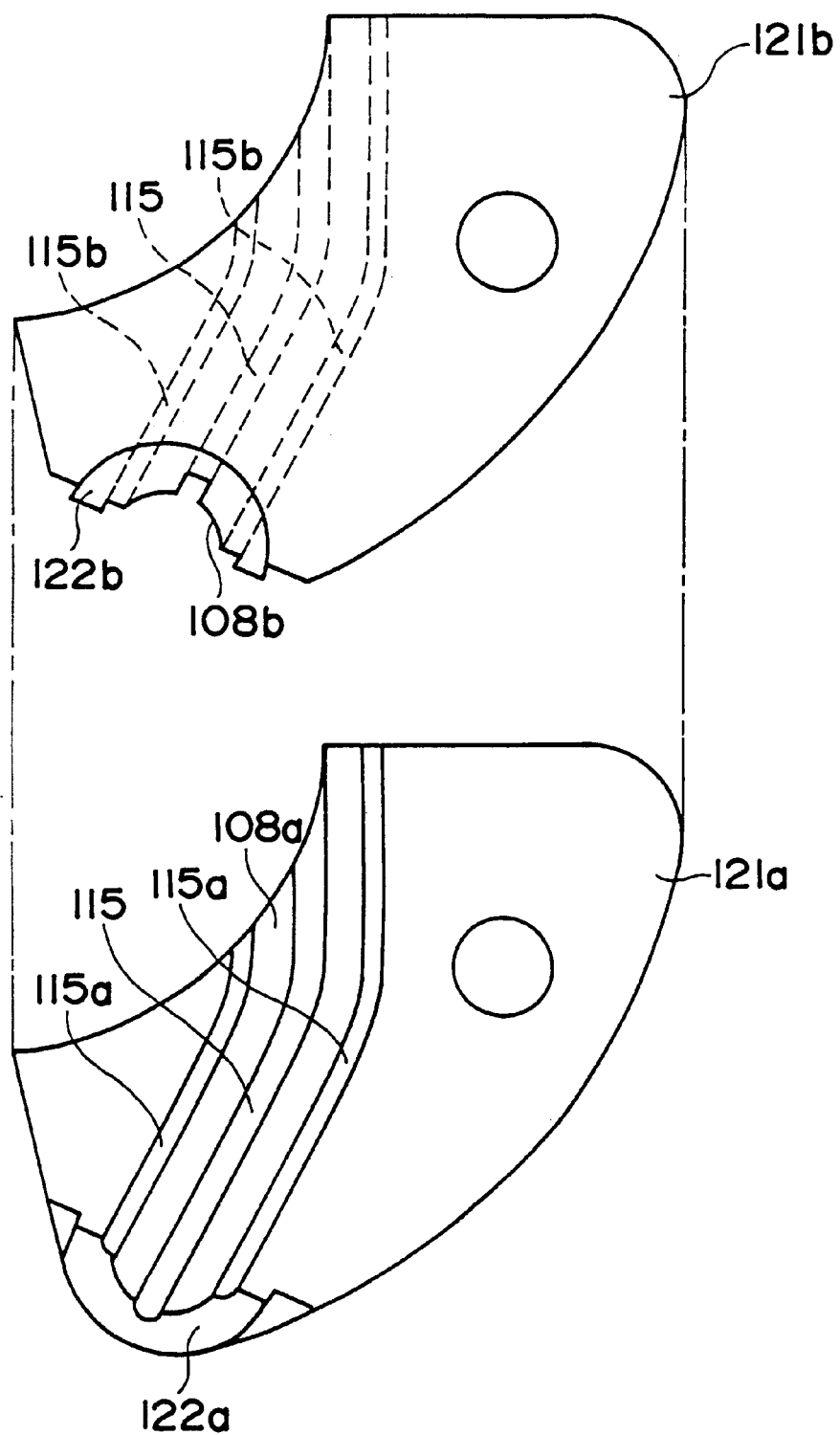
FIG. 33 is a plan view of the first and second strips forming the return piece shown in FIG. 32.

In this third embodiment, the first and second strips 121a and 121b forming the return piece 118 fit within the concave portions 119 of the cover body 120 in an overlapped state as shown in FIGS. 31 through 33. Each of the strips 121a and 121b is made of a metal such as brass subjected to cutting and the connecting surface thereof is provided with substantially semicircular concave grooves 118a and 118b formed by bisecting the change direction path 108 along the opposing guide grooves 115 and the grooves 118a and 118b are provided with guide grooves 115a and 115b bisected along both side edges of the grooves 118a and 118b, respectively, so that when the connecting surfaces of these first and second strips 121a and 121b are overlapped, the change direction path 108 of each of the return pieces 118 is completed.

Further, the first and second strips 121a and 121b are provided with semi-circular projections 122a and 122b, respectively, so as to extend toward the nut 102 in correspondence to the bisected change direction paths 108 and when the return piece 118 formed by overlapping the first and second strips 121a and 121b through their connecting surfaces is assembled into the concave portion 119 of the cover body 120, a positioning boss 122 of the return piece 118 formed by a combination of the projections 122a and 122b projects toward the inner surface of the completed side cover 103 (refer to FIGS. 29 and 30) so as to fit in a positioning concave portion 123 (refer to FIGS. 27 and 28)formed on the peripheral edge of the ball return hole 107 opening at both ends of the nut 102.

Figure 34:
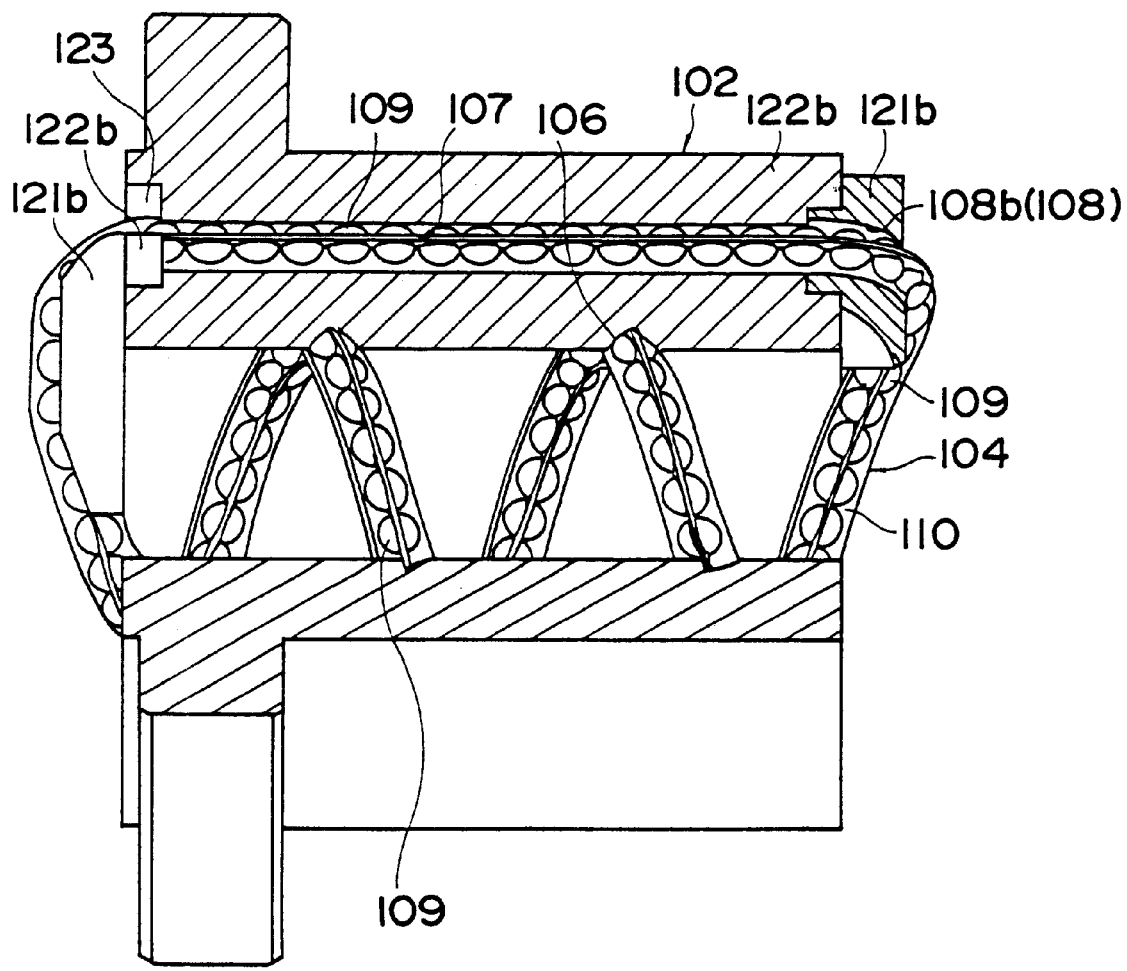
FIG. 34 is a simulative view illustrating the relationship between the nut and the ball endless track of the side cover type ball screw unit shown in FIG. 23.
Figure 35:
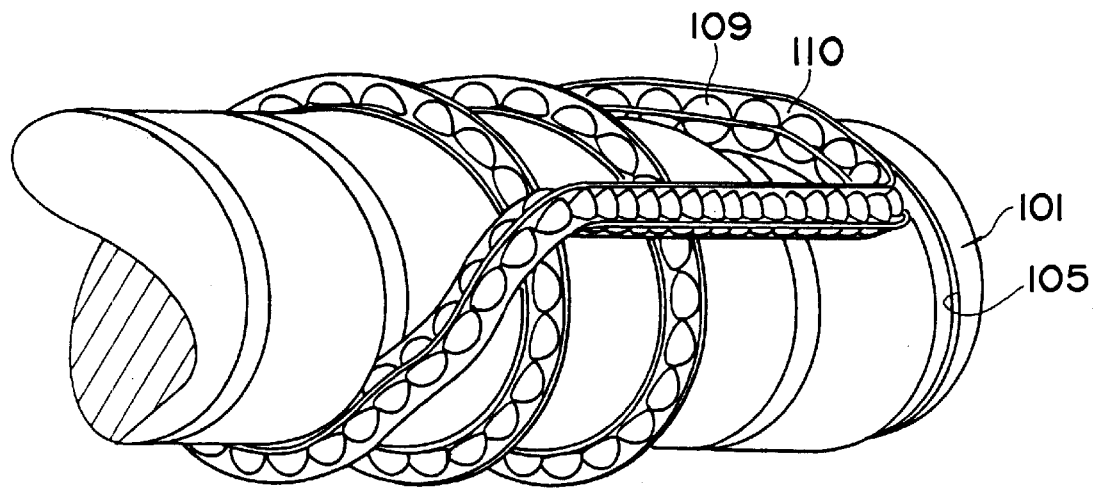
FIG. 35 is a simulative view illustrating the relationship between the screw and the ball endless track of the side cover type ball screw unit shown in FIG. 23.

In this third embodiment, the non-endless ball coupler 104 is assembled into each of the endless tracks formed by the load rolling groove 106 and the ball return hole 107 of the nut 102 and the change direction paths 108 of the side covers 103 to be attached to both ends of the nut 102 in such a manner that, as shown in FIGS. 34 and 35 the four belts 112 of each of the coupling members 110 are deviated in phase by 90° while the coupler 104 makes a round of the endless track whereby the degree of twisting and bending processes required to be performed within the change direction paths 108 is mitigated thereby allowing the non-endless ball coupler 104 to circulate through the endless track more smoothly. It should be noted that in FIGS. 34 and 35, the ball coupler 104 is simulatively depicted so that the manner of how each of the ball coupling members 110 is twisted can be understood easily.

Figure 36:
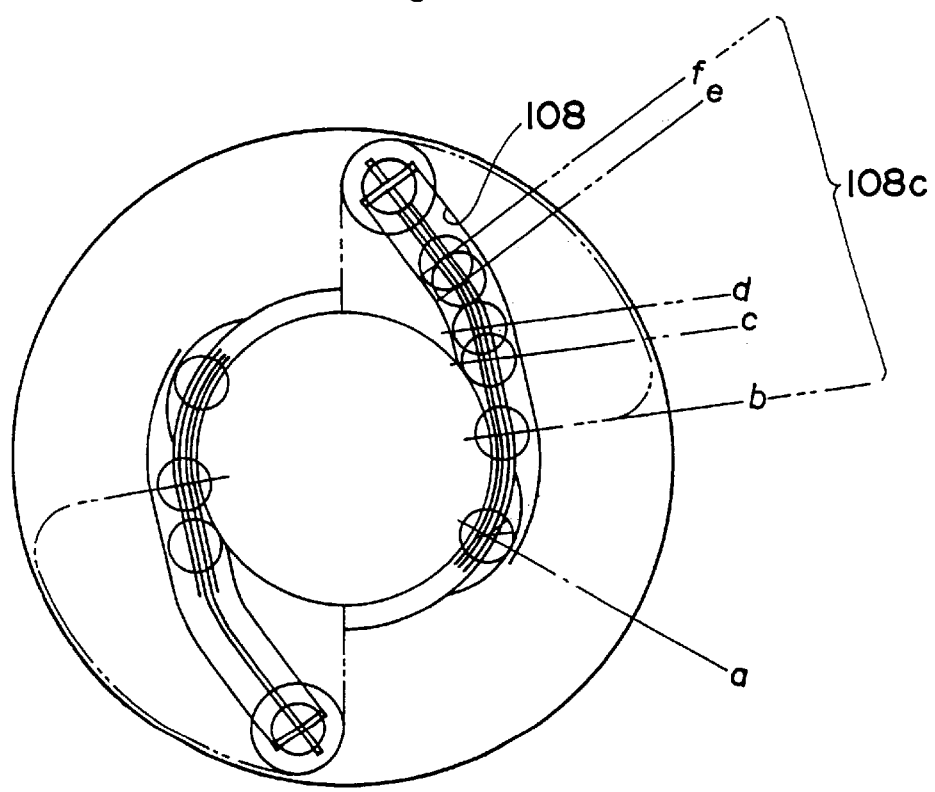
FIG. 36 is a simulative view illustrating the relationship between the side covers and the ball endless track of the side cover type ball screw unit shown in FIG. 23.
Figure 37:
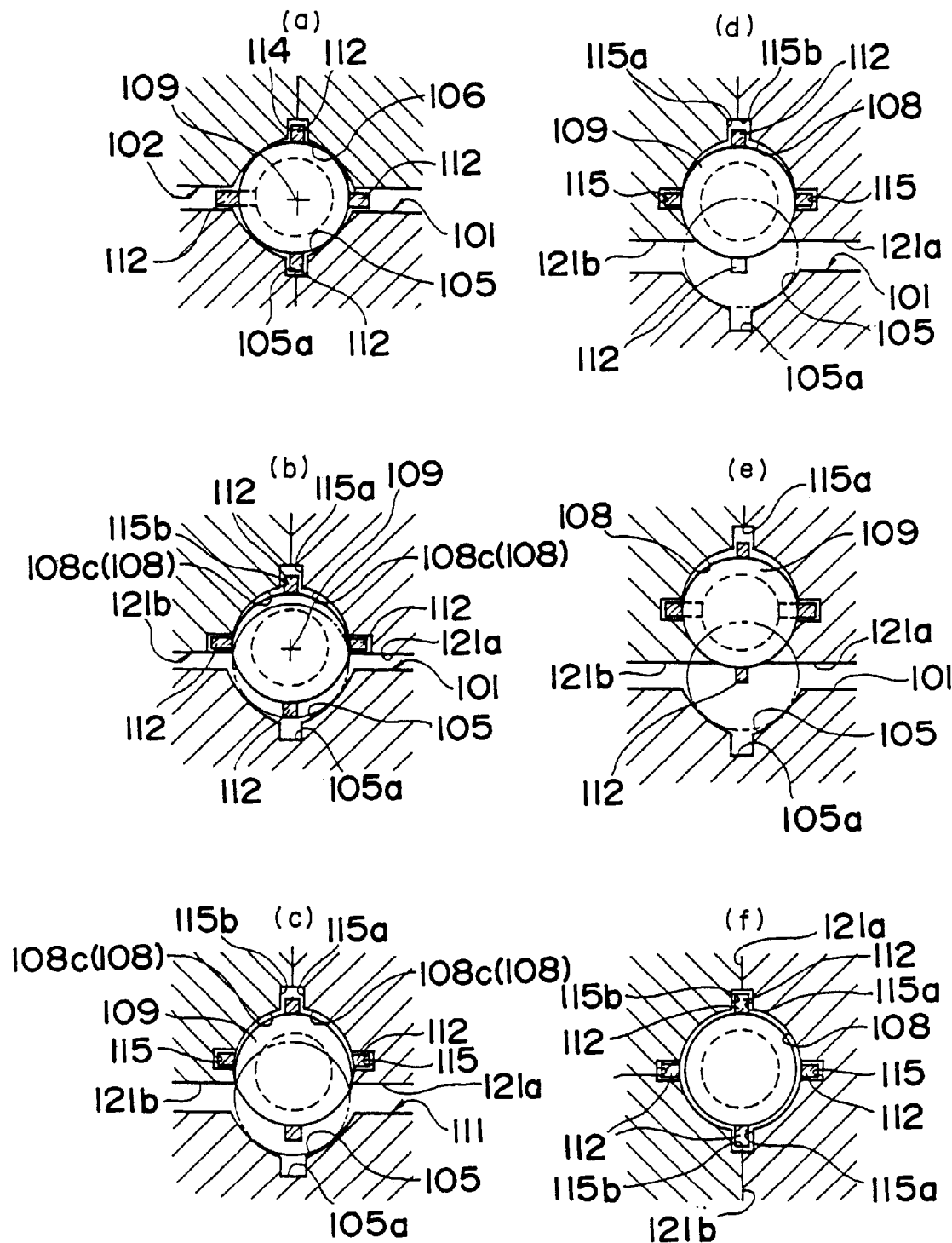
FIG. 37 is a simulative sectional view of the ball endless track shown in FIG. 36 especially when taken at positions a through f.

Further, FIGS. 36 and 37 illustrate the movement of the non-endless ball coupler 104 within the guide section 118c of each of the change direction paths 108. FIGS. 37(a) through 37(f) show sections of each of balls normal to the rolling direction of the ball with the sections corresponding to the positions a through f of each ball shown in FIG. 36.

At the ball position a in FIG. 36, each of the balls 109 of the end-to-end ball coupler 104 rolls through the ball rolling groove 105 of the screw 101 and the load rolling groove 106 of the nut 102 while it bears a load as shown in FIG. 37(a) and at the ball position b in FIG. 36, each of the balls 109 enters the guide section 118c of each of the change direction paths 108 after coming out from the load zone formed by the load rolling groove 106, moves tangentially along the lead angle of the load rolling groove 106 and enters the change direction path 108 after leaving the ball rolling groove 105 of the screw 101 as shown in FIG. 37(b). In this case, each of the balls 109 comes to be guided by each of the coupling members 110 of the non-endless ball coupler 104 moving from the load rolling groove 106 to the direction change path 108 from the very moment it has come out from the load zone of the load rolling groove 105.

Further, each of the balls 109, during the time in which it moves from the position c to the position e through the position d in FIG. 36, further moves tangentially along the lead angle of the load rolling groove 106 to leave further from the ball rolling groove 105 of the screw 101 so that the belts 112 of each of the coupling members 110 forming the non-endless ball coupler 104 located between the screw 101 and the nut 102 in the load zone of the endless track are guided into the opposing guide grooves 115 formed on the first and second strips 121a and 121b forming the return pieces 118 whereby the ball 109 leaves still further from the ball rolling groove 105 of the screw 101 and at the position f in FIG. 36, it is completely guided into the change direction path 108.

Thus, the non-endless ball coupler 104 is subjected to predetermined twisting and bending processes from the above position f to the outlet of the change direction path 108 and at the outlet of the change direction path 108, the four guide grooves 115 of the path 108 come to be positioned obliquely up and down with respect to the horizontal.

The guide grooves 115 of each of the ball return holes 107 formed axially in the outer peripheral solid portion of the nut 102 are formed a the same position as the guide grooves 115 at the outlet of each of the change direction paths 108 so that the non-endless ball coupler 104 is smoothly guided from the change direction path 108 to the ball return hole 107 or from the ball return hole 107 to the change direction path 108.

Figure 38:
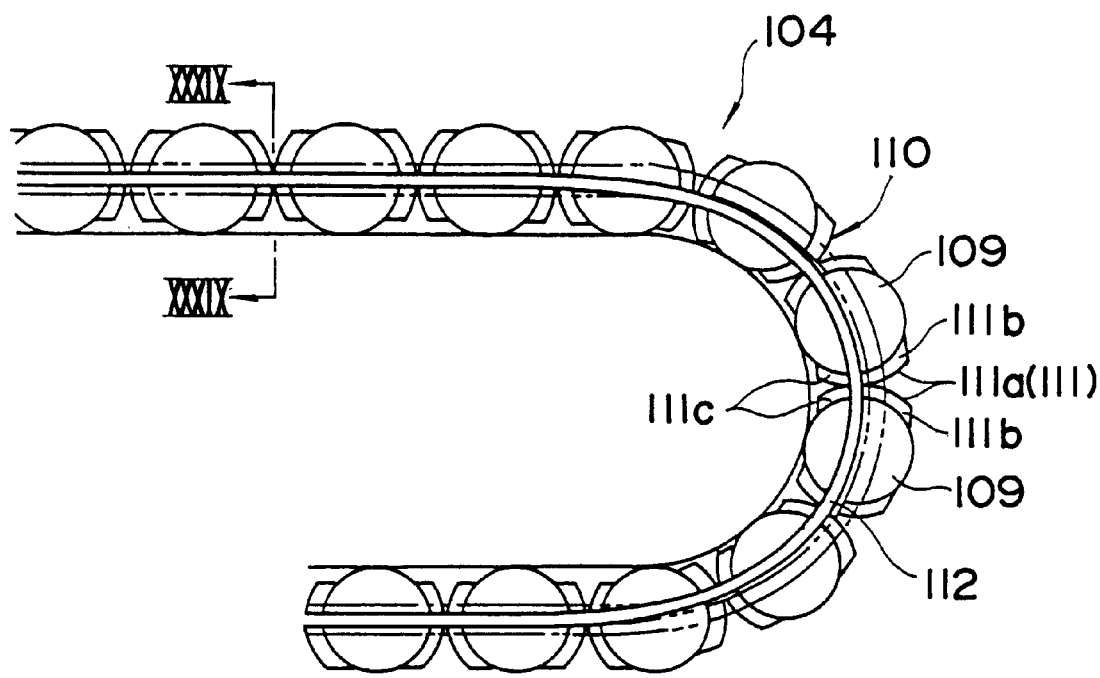
FIG. 38 is a partial front view of a modification of a non-endless ball coupler to be assembled into a side cover type ball screw unit.
Figure 39:
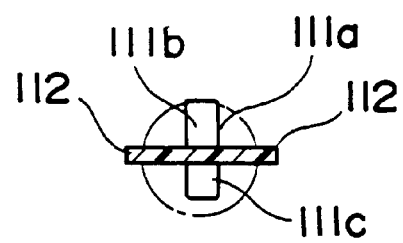
FIG. 39 is a sectional view taken along the XXXIX—XXXIX line of FIG. 38.
Figure 40:
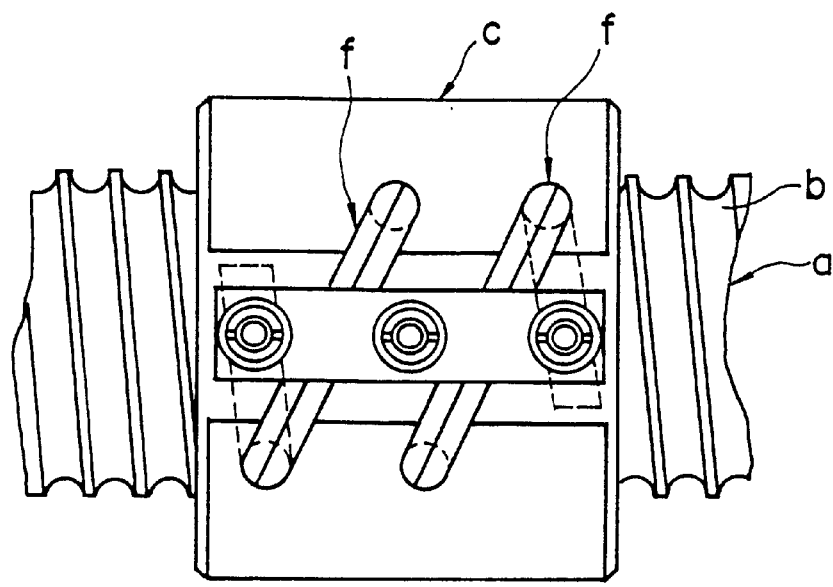
FIG. 40 is a plan view of a conventional tube type ball screw unit.
Figure 41:
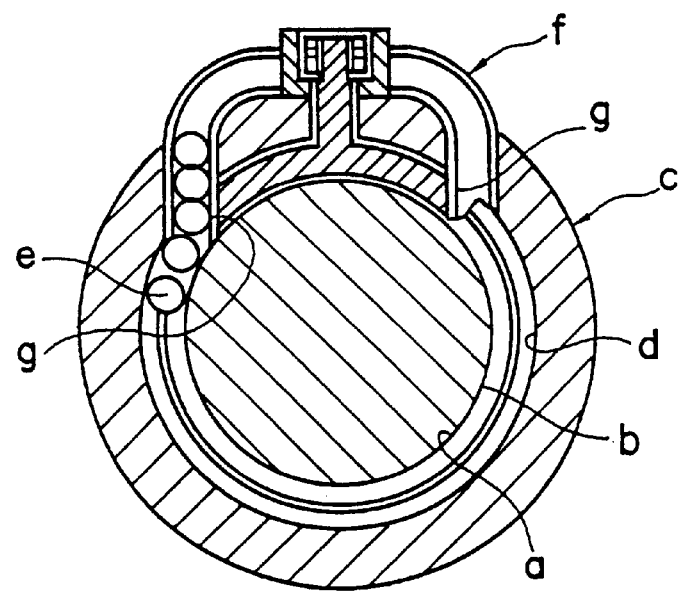
FIG. 41 is a sectional view of the conventional tube type ball screw unit shown in FIG. 40.
Figure 42:
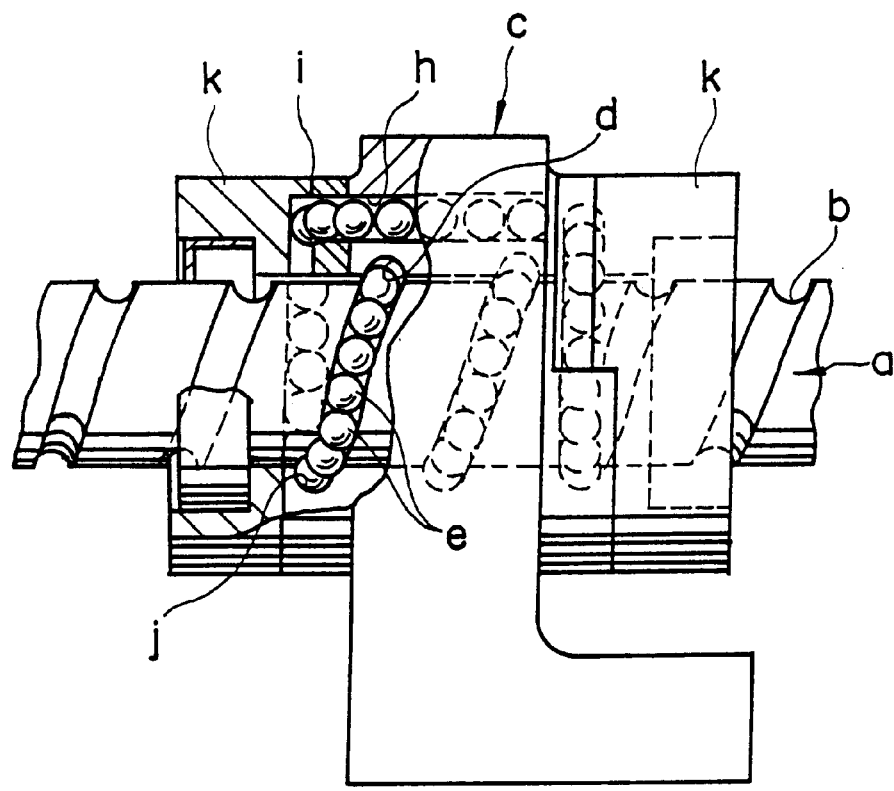
FIG. 42 is a partial front sectional view of a conventional side cover type ball screw unit.
Figure 43:
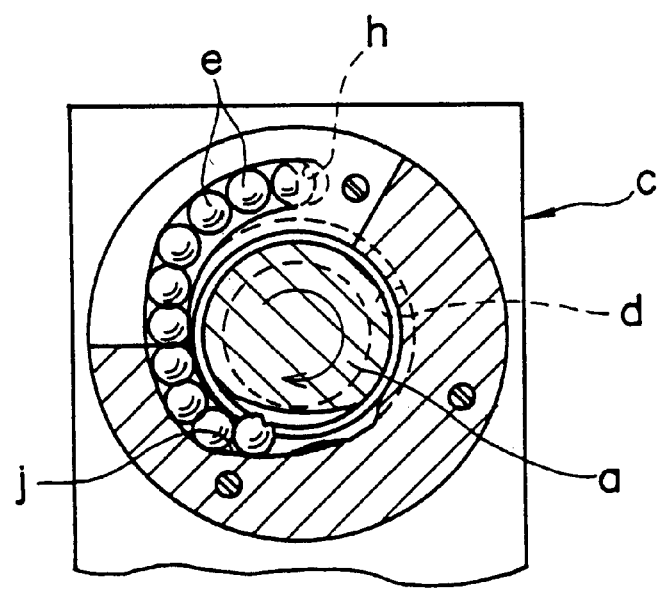
FIG. 43 is a partial side sectional view of a nut of the ball screw unit shown in FIG. 42.
Figure 44:
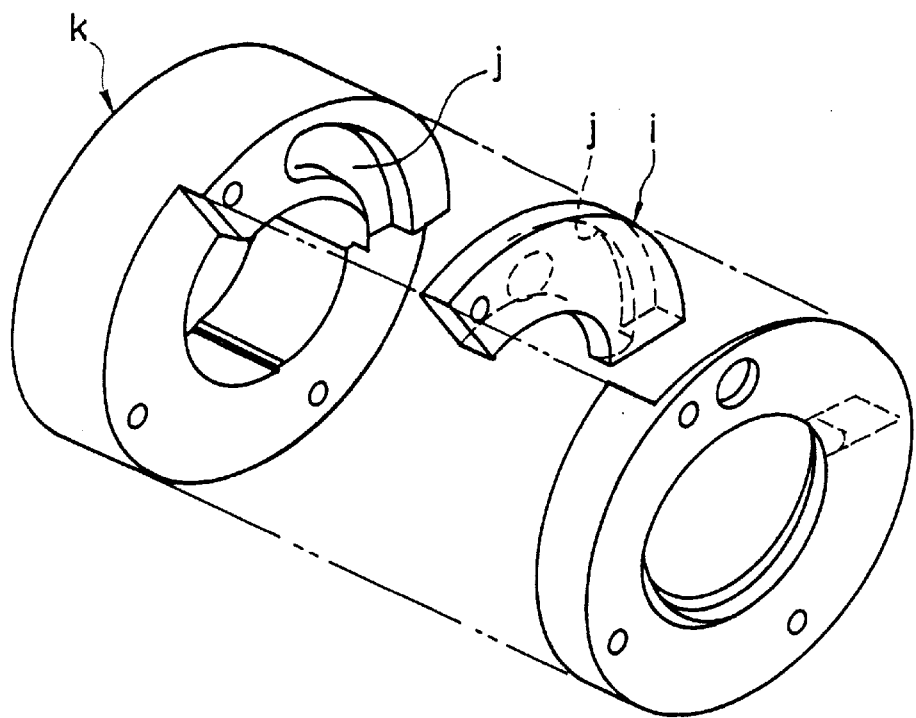
FIG. 44 is a view illustrating how the side covers of the ball screw unit shown in FIG. 20 are mounted.
Figure 45:
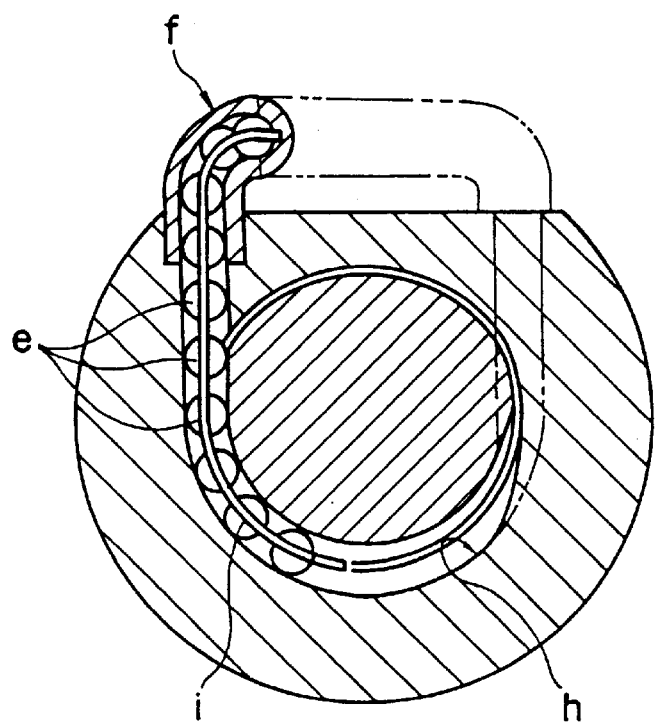
FIG. 45 is a front sectional view of another conventional tube type ball screw unit.

Next, FIGS. 38 and 39 show a variation of the non-endless ball coupler 104. Unlike the structure shown in FIGS. 25 and 26, this variation is constructed such that each of the interposers 111 defining the coupling members 110 therebetween comprises a pair of retaining strips 111a coming into contact with the spherical surface of each of the balls 109 and two belts 112 for coupling the balls 109 by contacting each of the balls along the spherical surface thereof between the interposers 111 are provided at a position intersecting at right angles with the retaining strips 111a.

Each of the retaining strips 111a is so formed that when the non-endless ball coupler 104 is assembled into the endless track, a projected portion 111b of the strip 111a located on the side of the outer periphery of the endless track with respect to the belts 112 guided within the endless track along the guide groove (not shown) is longer than a projected portion 111c thereof located on the side of the inner periphery of the endless track so that when the non-endless ball coupler 104 is bent toward the inner peripheral surface of the endless track along a plane connecting two of the belts 112, the tip of the adjoining projected portion 111c does not interfere with the bending of the coupler 104.

Where the non-endless ball coupler 104 is used according to this variation, if the belts 112 of each of the coupling members 110 are allowed to pass through the gap between the screw 101 and the nut 102, the formation of the relief groove or undercut for causing the belts 112 to be slidably received into the ball rolling groove of the screw or the load rolling groove of the nut forming the load zone of the ball endless track is no more necessary thereby facilitating the machining of the ball rolling groove and the load rolling groove.

Also, where the non-endless ball coupler 104 according to this variation is used, guide grooves for slidably guiding the belts 112 of each of the coupling members 110 are formed in the no-load ball path of the nut forming the no-load zone of the ball endless track or in each of the change direction paths formed in the side covers respectively attached to both ends of the nut, and further, in the direction change paths, the required twisting and/or bending processes are performed over the range from the starting ends of the change direction paths on the load rolling groove side to the terminating ends thereof on the no-load ball path side thereof so that the guide grooves at the starting ends thereof on the load rolling groove side are held in symmetrical positional relationship with each other while they are held in the same positional relationship with each other at the terminating ends thereof on the no-load ball path side.

INDUSTRIAL APPLICABILITY

According to the ball screw unit of the present invention, the ball coupler which retains a number of balls in their rotatably aligned state by means of coupling members forming the ball coupler is assembled into the endless track of the unit, the guide grooves for guiding the ball coupler are formed in the no-load zone of the endless track, the ball coupler is moved by each of the balls in the load zone of the endless track while the balls are guided to move by the ball coupler in the no-load zone and the guide sections for guiding the ball coupler along the progressing direction of the balls moving along the load rolling groove are provided in the no-load ball path at positions at least on the sides of the load rolling groove so that the delivery and reception of the balls between the load zone and the no-load zone of the ball endless track can be performed quite smoothly thereby achieving the smooth circulation of the balls.

What is claimed is:

1. A ball screw unit provided with a screw having a helical ball rolling groove on the outer peripheral surface thereof, a nut assembly having a load zone comprising a helical load rolling groove opposing to the helical ball rolling groove of the screw and a no-load zone forming a ball endless track by establishing communication between a starting end and a terminating end of the load zone, a number of balls rolling within the ball endless track of the nut assembly and a ball coupler comprising a plurality of coupling members capable of retaining the balls in their rotatably aligned state, wherein a guide groove for guiding the coupling members of the ball coupler is formed in the no-load zone of the ball endless track such that the coupling members are moved by the balls in the load zone of the ball endless track while the balls are guided to move by the coupling members in the no-load zone of the endless track, and guide sections for guiding the coupling members along the progressing direction of the balls moving in the load zone are respectively provided at least at both ends of the no-load zone lying near the load zone.

2. The ball screw unit as described in claim 1, wherein the ball screw unit is of a tube type and wherein said nut assembly comprises a nut having on the inner peripheral surface a helical load rolling groove opposing to the ball rolling groove of said screw and a ball circulating tubular body attached to the nut and having a no-load ball path for forming a ball endless track by establishing communication between a starting end and a terminating end of said load rolling groove and wherein a guide groove for guiding said ball coupler is formed in the no-load zone of said endless track formed by said no-load ball path such that said ball coupler is moved by the balls in the load zone of the endless track formed by said load rolling groove while the balls are guided to move by the ball coupler in the no-load zone of the endless track and guide sections for guiding said ball coupler along the progressing direction of the balls moving along said load rolling groove are provided on the no-load ball path at least on the side of said load rolling groove.

3. The tube type ball screw unit as described in claim 2, wherein said ball circulating tubular body comprises a pair of tubular pieces and a tubular body for establishing communication between said pair of tubular pieces and wherein each of said tubular pieces is provided at least on the side of said load rolling groove with a guide hole which includes a guide zone for guiding each of the balls tangentially along the lead angle of said load rolling groove.

4. The tube type ball screw unit as described in claim 3, wherein the guide holes of said pair of tubular pieces are twisted and/or bent over the range from the starting ends thereof on the side of the load rolling groove of the nut to the terminating ends thereof on the side of the communication hole of said tubular body so that the guide grooves are held in symmetrical positional relationship with each other at the starting ends of the guide holes on the side of said load rolling groove while they are held in the same positional relationship with each other at the terminating ends thereof on the side of said communication hole.

5. The tube type ball screw unit as described in claim 3, wherein the entire length of the guide hole of each of said pair of the tubular pieces forms a guide zone and a part or the whole of the guide groove of said each guide hole is twisted, the tubular body for establishing communication between said pair of tubular pieces is provided with guide grooves at the same position over a range from the starting end to the terminating end thereof and has bent portions on the sides of the starting and terminating ends thereof, respectively.

6. The tube type ball screw unit as described in claim 5, wherein said pair of tubular pieces are formed to the same shape and the tubular members for establishing communication between said pair of tubular pieces are formed of a pair of tubular strips of the same shape.

7. The tube type ball screw unit as described in any one of claims 3 through 6, wherein each of said tubular pieces is formed non-circular in section and is positioned by being fitted into a non-circular fitting hole formed in the nut.

8. The tube type ball screw unit as described in any one of claims 3 through 6, wherein a single non-endless ball coupler or a plurality of non-endless ball couplers comprising a plurality of coupling members having both ends is or are assembled into said ball endless track.

9. The tube type ball screw unit as described in any one of claims 3 through 6, wherein a single endless ball coupler comprising a plurality of coupling members is assembled into said ball endless track.

10. The ball screw unit as described in claim 1, wherein the ball screw unit is of a side cover type characterized in that said nut assembly comprises a nut having on the inner peripheral surface thereof a helical load rolling groove opposing to the ball rolling groove of said screw and a no-load ball path, and a pair of side covers attached on the both ends of the nut and each having a change direction path for forming a ball endless track by establishing communication between said load rolling groove and said no-load ball path and that a guide groove for guiding said ball coupler is formed in the no-load zone of the endless track formed by said change direction paths and said no-load ball path such that said ball coupler is moved by said balls in the load zone of said endless track formed by said load rolling grooves while the balls are guided to move by said ball coupler in said no-load zone, and further that each of said change direction paths is provided at least on the side of said load rolling groove with a guide section for guiding said ball coupler along the progressing direction of the balls rolling along said load rolling groove.

11. The side cover type ball screw unit as described in claim 10, wherein the change direction paths of the pair of side covers establishing communication between the load rolling groove and the no-load ball path of the nut at both ends of the nut are twisted and/or bent over a range from their starting ends on the side of the load rolling groove to their terminating ends on the side of the no-load ball path so that the guide grooves are held in a symmetrical positional relationship with each other at the starting ends thereof on the side of the load rolling groove while they are held in the same positional relationship with each other at the terminating ends thereof on the side of the no-load ball path.

12. The side cover type ball screw unit as described in claim 11, wherein each of the side covers comprises a pair of return pieces each having a change direction path establishing communication between the load rolling groove and the no-load ball path of the nut and a cover body to be fixed to each end of the nut and having concave portions for receiving the return pieces, each of said return pieces comprising first and second strips formed by bisecting the return piece along the axis of the change direction path thereof.

13. The side cover type ball screw unit as described in claim 12, wherein the first and second strips of said each return piece are each provided with a semi-circular strip projecting toward the nut in correspondence to the bisected direction change paths and a side cover positioning boss is formed by a pair of said projecting trips arranged in the first and second strips.

14. The side cover type ball screw unit as described in any one of claims 10 through 13, wherein a single non-endless ball coupler comprising a plurality of non-endless coupling members each having two ends or a plurality of ball couplers comprising such coupling members is or are assembled into said ball endless track.

15. The side cover type ball screw unit as claimed in any one of claims 10 through 13 , wherein a single endless ball coupler comprising coupling members is assembled into said ball endless track.

* * * * *

UNITED STATES PATENT AND TRADEMARK OFFICE
CERTIFICATE OF CORRECTION

PATENT NO. : 6,089,117

DATED : July 18, 2000

INVENTOR(S) : EBINA et al.

It is certified that error appears in the above-identified patent and that said Letters Patent is hereby corrected as shown below:

Item [54], please delete--BALL SCREW DEVICE--, and insert BALL SCREW UNIT.

Signed and Sealed this

Twenty-second Day of May, 2001

Attest:

NICHOLAS P. GODICI

Attesting Officer   Acting Director of the United States Patent and Trademark Office